United States Patent
Roh et al.

(10) Patent No.: US 6,850,294 B2
(45) Date of Patent: Feb. 1, 2005

(54) LIQUID CRYSTAL DISPLAY

(75) Inventors: Nam-Seok Roh, Seongnam (KR);
Mun-Pyo Hong, Seongnam (KR);
Chong-Chul Chai, Seoul (KR);
Soo-Guy Rho, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/469,848
(22) PCT Filed: Feb. 25, 2002
(86) PCT No.: PCT/KR02/00303
§ 371 (c)(1),
(2), (4) Date: Sep. 4, 2003
(87) PCT Pub. No.: WO03/056383
PCT Pub. Date: Jul. 10, 2003

(65) Prior Publication Data
US 2004/0085495 A1 May 6, 2004

(51) Int. Cl.⁷ .............................................. G02F 1/1368
(52) U.S. Cl. .................... 349/106; 349/61; 349/109; 349/138; 349/39
(58) Field of Search .............................. 349/38, 39, 43, 349/61, 106, 109, 138, 149, 108; 345/88, 92, 690; 348/589

(56) References Cited

U.S. PATENT DOCUMENTS 6,667,777 B2 * 12/2003 Kikkawa et al. ............... 349/38
2002/0015110 A1 * 2/2002 Brown Elliott ............. 348/589
2003/0117423 A1 * 6/2003 Brown Elliott et al. ..... 345/690

FOREIGN PATENT DOCUMENTS

| JP | 60-107022 | 6/1985 |
| JP | 02-234119 | 9/1990 |
| JP | 2001-108999 | 4/2001 |

* cited by examiner

Primary Examiner—Toan Ton
Assistant Examiner—Tai Duong
(74) Attorney, Agent, or Firm—Cantor Colburn LLP

(57) ABSTRACT

Pixels of red, blue and green are sequentially arranged in the row. The red and green pixels are alternately arranged in the column while the blue pixels being repeatedly arranged in the column. The four red and green pixels surrounding the two blue pixels at the two neighboring pixel rows face each other around the blue pixels. Gate lines are arranged at the respective rows to transmit scanning signals. Data lines cross over the gate lines in an insulating manner, and are arranged at the respective columns to transmit picture signals. Pixel electrodes and thin film transistor are formed at respective pixels. The blue pixel has the same area as or an area smaller than the red and green pixels. The pixel electrodes are overlapped with the gate or the data lines via a passivation layer of low dielectric organic material or an insulating material such as SiOC, SiOF.

9 Claims, 15 Drawing Sheets

| | Red:Green:Blue (Optimum condition) | x | y |
|---|---|---|---|
| Condition 1 | 1:1:1 | 0.3034 | 0.3143 |
| | 1.05:1.05:0.9 | 0.3085 | 0.3213 |
| | 1.1:1.1:0.8 | 0.3137 | 0.3284 |
| | 1.15:1.15:0.7 | 0.319 | 0.3356 |
| | 1.2:1.2:0.6 | 0.3243 | 0.3429 |
| Condition 2 | 1:1:1 | 0.298 | 0.308 |
| | 1.05:1.05:0.9 | 0.303 | 0.3148 |
| | 1.1:1.1:0.8 | 0.3082 | 0.3217 |
| | 1.15:1.15:0.7 | 0.3133 | 0.3287 |
| | 1.2:1.2:0.6 | 0.3185 | 0.3358 |
| Condition 3 | 1:1:1 | 0.293 | 0.301 |
| | 1.05:1.05:0.9 | 0.2979 | 0.3077 |
| | 1.1:1.1:0.8 | 0.3028 | 0.3144 |
| | 1.15:1.15:0.7 | 0.3078 | 0.321 |
| | 1.2:1.2:0.6 | 0.3128 | 0.328 |

LIQUID CRYSTAL DISPLAY

BACKGROUND OF THE INVENTION (a) Field of the Invention

The present invention relates to a liquid crystal display and, more particularly, to a liquid crystal display which involves a Pentile Matrix pixel arrangement structure for displaying picture images at high resolution.

(b) Description of the Related Art

Generally, a liquid crystal display has two substrates with electrodes, and a liquid crystal layer sandwiched between the two substrates. Voltages are applied to the electrodes so that the liquid crystal molecules in the liquid crystal layer are re-oriented to thereby control the light transmission.

The liquid crystal display has a plurality of pixels with pixel electrodes and color filters of red, green and blue. The pixels are driven by way of signals applied through the wiring lines. The wiring lines include scanning signal lines or gate lines for carrying scanning signals, and picture signal lines or data lines for carrying the picture signals. Thin film transistors are formed at the respective pixels while each being connected to one gate line and one data line. The picture signals applied to the pixel electrodes are controlled by way of the thin film transistors.

There are several types of arrangement with the color filters of red, green and blue. Among them are a stripe type where the color filters of the same color are arranged at the respective pixel columns, a mosaic type where the color filters of red, green and blue are sequentially arranged in the pixel row and column directions, and a delta type where the pixels are zigzag-alternated in the pixel column direction, and the color filters of red, green and blue are sequentially arranged at the pixels. In the case of the delta type, the three unit pixels with the color filters of red, green and blue are operated as one dot, and this makes it easy to express a circle or a diagonal line.

The ClairVoyante Laboratories have proposed a pixel arrangement structure called the "PenTile Matrix™," which has a high resolution expression capacity advantageous in displaying pictures while being involved minimized design cost. In such a pixel arrangement structure, the unit pixel of blue is common to two dots, and the neighboring blue pixels receive the data signals from one data driving IC while being driven by two different gate driving ICs. With the use of the PenTile Matrix pixel structure, the resolution of the UXGA level can be realized by way of a display device of the SVGA level. Furthermore, the number of low-cost gate driving ICs is increased, but the number of high-cost data driving ICs is decreased. This minimizes the design cost for the display device.

However, in the above-structured liquid crystal display, the unit pixels of blue are arranged in the shape of a diamond and correspondingly, the signal lines for carrying the data signals are bent. Consequently, only the data signal line for transmitting the relevant signals to the blue pixels is elongated so that delay in the signal transmission is made with respect to the data signals for the blue pixels, and the display characteristic becomes to be non-uniform. Therefore, there is a limit in applying the Pentile Matrix pixel arrangement structure to the large-sized liquid crystal display. Furthermore, the red or green pixels are provided around the blue pixel per the two pixel columns, and the blue pixel differs in size from the red or green pixel. This makes it very difficult to form storage capacity required for the liquid crystal display.

Meanwhile, the data signal lines for transmitting data signals to the red or green pixels, or two gate signal lines are placed close to each other so that the wiring lines are liable to be short-circuited while reducing the production yield and deteriorating the display characteristic. Furthermore, as the neighboring blue pixels are driven by one driving IC, the data driving IC should be provided at both sides of the display region and this induces enlargement of the display device. In addition, with this structure, it becomes difficult to form repair lines at the periphery of the display region. The repair lines are to prevent the wiring lines from being cut or short-circuited.

In order to prevent the liquid crystal from being deteriorated, the inverse-driving technique should be used to drive the display device. However, in this case, polarity is non-uniformly made with respect to the red, green and blue pixels while generating flicker as well as brightness difference among the pixel columns. This deteriorates the picture quality of the resulting display device.

Meanwhile, in the liquid crystal display with the Pentile Matrix pixel arrangement structure, the rendering technique should be used in driving the pixels to display the picture images at high resolution.

SUMMARY OF THE INVENTION

It is an object of the present invention to provide a thin film transistor array substrate for a liquid crystal display which involves excellent display capacity while preventing the signal lines at the neighboring pixels from being short-circuited.

It is another object of the present invention to provide a thin film transistor array substrate for a liquid crystal display which involves excellent display capacity while securing the required amount of storage capacity in a stable manner.

It is still another object of the present invention to provide a thin film transistor array substrate for a liquid crystal display which involves excellent display capacity while being minimized in the substrate size with repair lines for repairing possible cutting or short-circuiting of the wiring lines.

It is still another object of the present invention to provide a thin film transistor array substrate for a liquid crystal display which involves regular inversion driving.

It is still another object of the present invention to provide a thin film transistor array substrate for a liquid crystal display to which the rendering technique of displaying picture images at high resolution is well adapted.

These and other objects may be achieved by a thin film transistor array substrate for a liquid crystal display with a Pentile Matrix pixel arrangement structure. In the thin film transistor array substrate, a data pad connection unit electrically interconnects the data lines at the neighboring blue pixel columns by way of one pad. The neighboring gate lines or the neighboring data lines are spaced apart from each other while interposing the pixels.

The data lines at the neighboring blue pixels of the first or second order are connected to each other by way of one pad while making the data lines at the neighboring red and green pixel columns cross each other to transmit the picture signals.

As with the red and the green pixels, the blue pixel has a thin film transistor and a pixel electrode, and the data line for transmitting the picture signals to the pixel is connected to a data pad.

The blue pixel is established to bear an area smaller than that of the red and the blue pixels.

The pixel electrodes formed at the respective pixels are overlapped with the gate lines or the data lines at their peripheral portions while interposing an organic insulating layer or a low dielectric insulating layer between them. The low dielectric insulating layer is formed with SiOC or SiOF through chemical vapor deposition.

Specifically, the liquid crystal display includes pixels of red, blue and green sequentially arranged in the row direction. The red and the green pixels are alternately arranged in the column direction while the blue pixels being repeatedly arranged in the column direction. The four red and green pixels surrounding the two blue pixels at the two neighboring pixel rows face each other around the blue pixels. Gate lines are arranged at the respective pixel rows to transmit scanning signals or gate signals to the pixels while proceeding in the horizontal direction. Data lines cross over the gate lines in an insulating manner to transmit picture signals or data signals to the pixels. The data lines are arranged at the respective pixel columns while proceeding in the vertical direction. Pixel electrodes are formed at the respective pixels in the pixel row and column directions to receive the data signals. Thin film transistors are formed at the respective pixels in the pixel row and column directions. The thin film transistors have gate electrodes connected to the gate lines, source electrodes connected to the data lines, and drain electrodes connected to the pixel electrodes.

The liquid crystal display is driven using a rendering technique. The pixel electrodes are overlapped with the front gate lines for transmitting the scanning or gate signals to the neighboring front pixel rows, or storage capacitor electrode lines formed at the same plane as the gate lines while being separated from the gate lines, thereby forming storage capacitors.

Storage capacitor conductive patterns are formed at the same plane as the data lines while being connected to the drain electrodes. The storage capacitor conductive patterns are overlapped with the storage capacitor electrode lines.

A passivation layer is formed between the pixel electrodes and the gate lines or the data lines with an acryl-based organic insulating material or a low dielectric insulating material bearing a dielectric constant of 4.0 or less through chemical vapor deposition. The passivation layer has contact holes for electrically connecting the pixel electrodes to the drain electrodes. The contact holes are formed over the storage capacitor conductive patterns.

Each data line is connected to a data pad for receiving the data signals from the outside. The pixel electrodes are formed with a transparent conductive material, or a reflective conductive material.

The blue pixel has an area smaller than the area of the green pixel and the red pixel. The liquid crystal display further has a backlight where the amount of light of the blue color is established to be larger than the amount of light of the red color and the green color, compared to the white color condition in that the ratios in the amount of light of the red, the green and the blue colors are 1:1:1.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
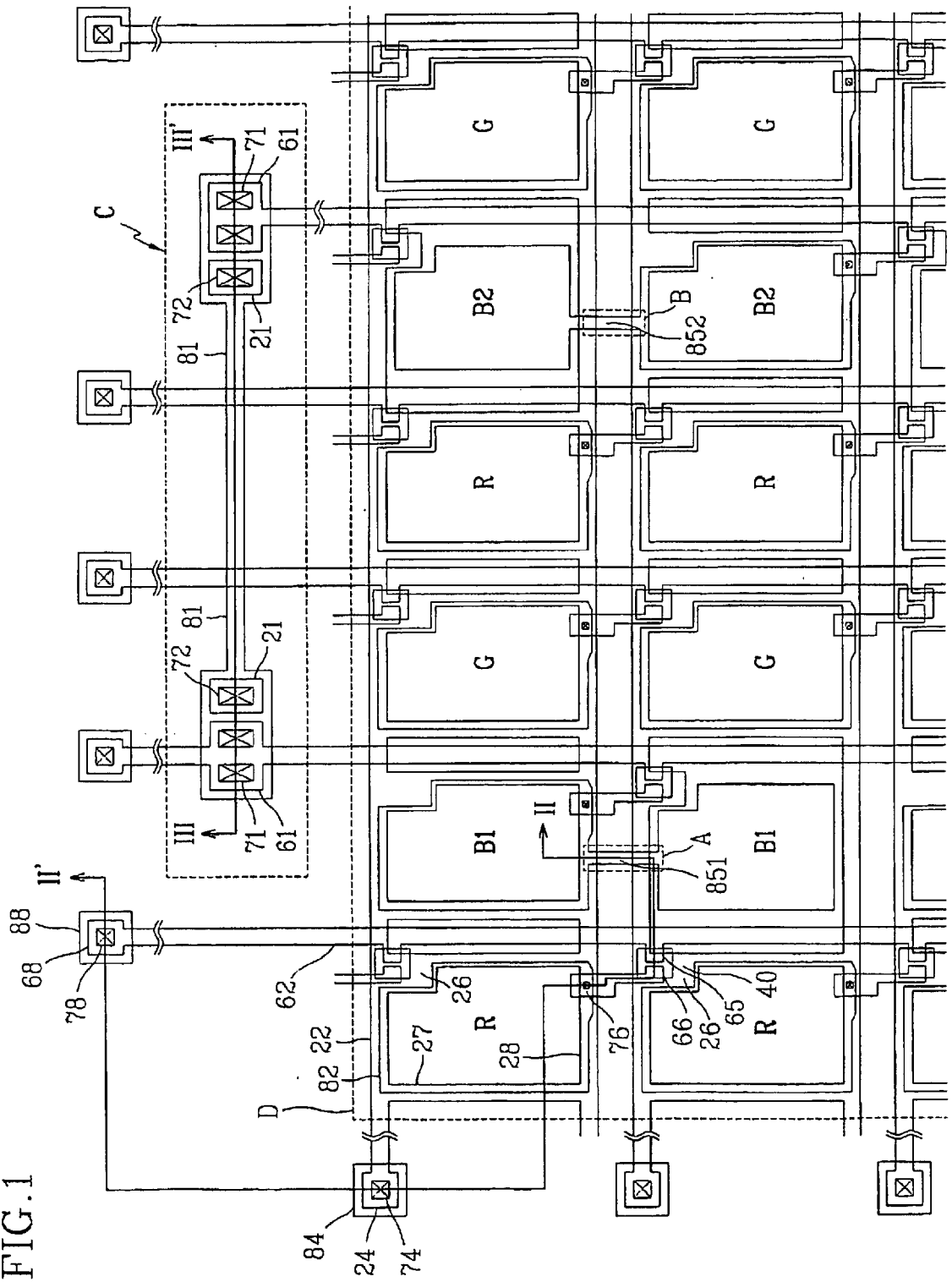
FIG. 1 is a plan view of a thin film transistor array substrate for a liquid crystal display according to a first preferred embodiment of the present invention.
Figure 2:
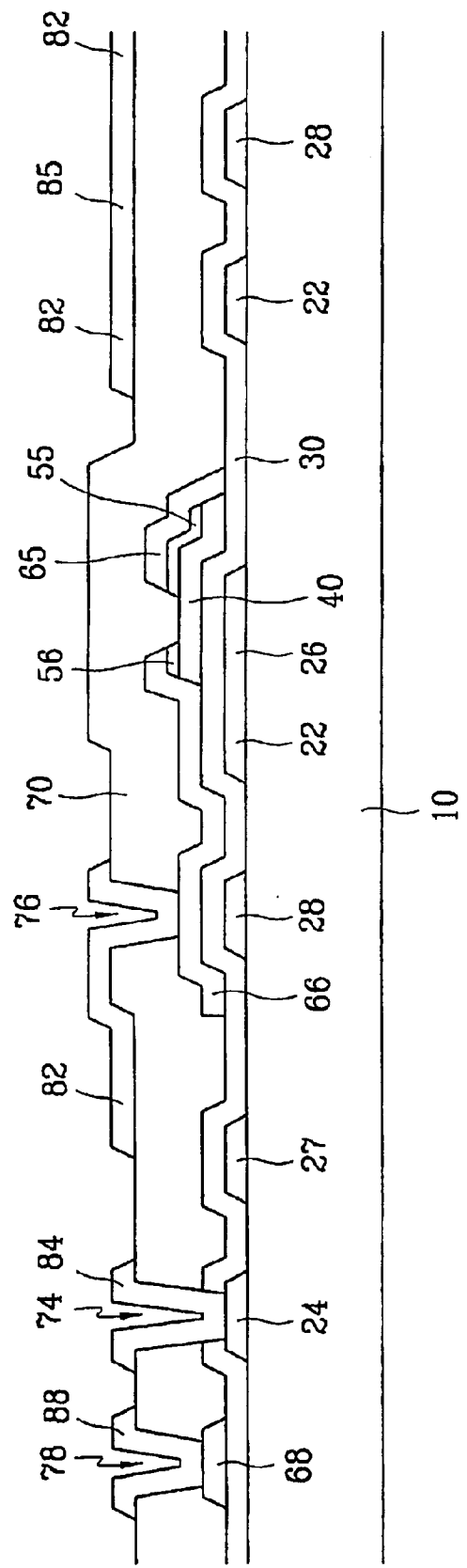
FIGS. 2 and 3 are cross sectional views of the thin film transistor array substrate taken along the II–II' line and the III–III' line of FIG. 1.
Figure 3:
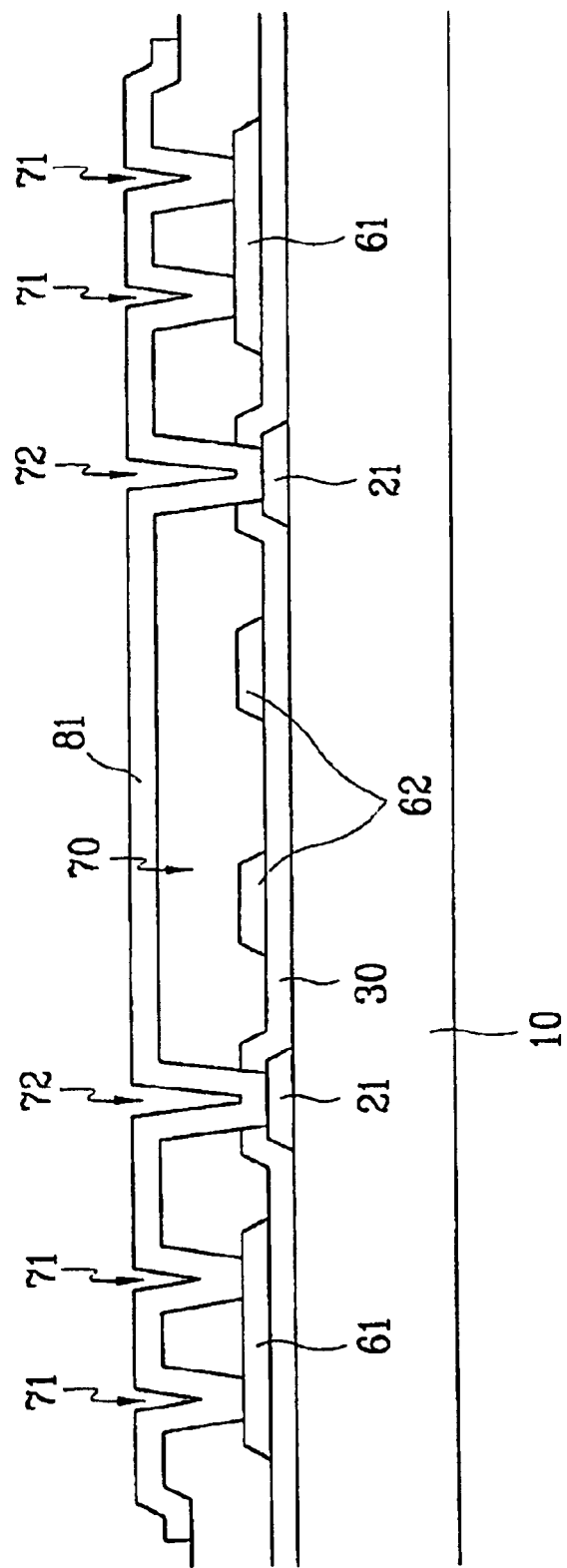

FIG. 1 is a plan view of a thin film transistor array substrate for a liquid crystal display according to a first preferred embodiment of the present invention, and FIGS. 2 and 3 are cross sectional views of the thin film transistor array substrate taken along the II–II' line and the III–III' line of FIG. 1. FIG. 2 specifically illustrates the pixel area and the pad area. FIG. 3 illustrates a connection unit C for interconnecting the data lines for transmitting data signals to the neighboring blue pixels B1 and B2 by way of one pad.

As shown in FIG. 1, pixels of red, blue and green R, B1, G, R, B2, and G are arranged in a matrix form at the thin film transistor array substrate. The red, blue and green pixels R, B1, G, R, B2 and G are sequentially arranged in the row direction with the same color pixel neighbors in the column direction. Alternatively, the red and green pixels R and G may be arranged such that the same color pixels face each other with respect to the blue pixels B1 and B2 in the diagonal direction. Gate lines (or scanning lines) 22 for carrying scanning signals or gate signals are formed at the respective pixel rows one by one while proceeding in the horizontal direction. Data lines 62 for carrying data signals cross over the gate lines 22 in an insulating manner while defining unit pixels. The data lines 62 are provided at the respective pixel columns one by one while proceeding in the vertical direction.

Thin film transistors are formed at the crossing area of the gate lines 22 and the data lines 62. Each thin film transistor has a gate electrode 26 connected to the gate line 22, a source electrode 65 connected to the data line 62, and a drain electrode 66 facing the source electrode 65 around the gate electrode 26 together with a semiconductor layer 40. A pixel electrode 82 is formed at each pixel such that it is electrically connected to the gate line 22 and the data line 62 through the thin film transistor. The pixel electrodes 82 for the blue pixels B1 and B2 at the two neighboring pixel rows are connected to each other by way of first and second pixel electrode connectors 851 and 852, which are alternately formed at each pixel column. The two neighboring blue pixels B1 and B2 with such pixel electrodes 82 involve one thin film transistor. The thin film transistors at the blue pixels B1 and B2 are alternately formed at each pixel row.

The first and the second pixel electrode connectors 851 and 852 are arranged such that they are overlapped with one gate line. Alternatively, the pixel electrode connectors may be arranged likewise with the thin film transistors such that one pixel electrode connector is provided at the two neighboring blue pixels B1 and B2 while being alternately formed at each pixel row. In this case, the first and the second pixel electrode connectors 851 and 852 may be overlapped with the gate lines for transmitting scanning signals to their own pixel columns.

The structure of the thin film transistor array substrate with such a pixel arrangement structure will be now explained with reference to FIGS. 1 to 3.

As shown in FIGS. 1 to 3, a gate line assembly is formed on an insulating substrate 10 with a metallic conductive material such as aluminum, aluminum alloy, molybdenum, chrome, tantalum, silver and silver alloy. The gate line assembly includes scanning lines or gate lines 22 and 28 doubly proceeding in the horizontal direction, gate electrodes 26 connected to the gate lines 22, gate line connectors 27 for interconnecting the gate lines 22 and 28, and gate pads 24 connected to the ends of the gate lines 22 to receive scanning signals from the outside and transmit them to the gate lines 22. The gate line assembly is overlapped with pixel electrodes 82 to thereby form storage capacitors for enhancing the electric potential storage capacity of the pixels. In case the desired amount of storage capacity is not obtained with the overlapping, a storage capacitor line assembly may be separately formed at the same plane as the gate line assembly such that it is overlapped with the pixel electrodes 82.

Meanwhile, first data pad connectors 21 are formed at the same plane as the gate line assembly. The first data pad connectors 21 are placed at the C area external to the display area D while interconnecting the data lines 62 at the neighboring blue pixel columns B1 and B2 by way of one data pad 68 such that the data signals are commonly transmitted to the pixel electrodes 82 at those blue pixel columns. The display area D refers to the area with the set of red, blue and green pixels R, B1, G, R, B2 and G.

The gate line assembly may be formed with a single-layered structure, a double-layered structure, or a triple-layered structure. In case the gate line assembly is formed with a double-layered structure, one layer is formed with a low resistance material, and the other layer is formed with a material bearing a good contact characteristic with other materials. For instance, Cr/Al or Al alloy or Al/Mo may be used for that purpose.

A gate insulating layer 30 is formed on the gate line assembly and the data pad connectors 21 with silicon nitride SiNx while covering them.

A semiconductor layer 40 is formed on the gate insulating layer 30 with hydrogenated amorphous silicon, and ohmic contact layers 55 and 56 are formed on the semiconductor layer 40 with amorphous silicon where n type impurities such as P are doped at high concentration.

A data line assembly is formed on the ohmic contact layers 55 and 56 with a conductive material such as Al, Al alloy, Mo, MoW alloy, Cr, Ta, Cu and Cu alloy. The data line assembly has a data line unit with data lines 62 proceeding in the vertical direction, source electrodes 65 connected to the data lines 62, and data pads 68 connected to the one-sided ends of the data lines 62 to receive picture signals from the outside. The data line assembly further has drain electrodes 66 facing the source electrodes 65 around the gate electrodes 26 while being separated from the data line unit. The data lines 62 at the neighboring blue pixel columns B1 and B2 have second data pad connectors 61 protruded from the ends thereof with a relatively large width. The first data pad connectors 21 are placed close to the second data pad connectors 61.

The data line assembly and the second data pad connectors 61 may be formed with a single-layered structure, a double-layered structure, or a triple-layered structure. In case they are formed with a double-layered structure, it is preferable that one layer is formed with a low resistance material, and the other layer is formed with a material bearing a good contact characteristic with other materials.

The ohmic contact layers 55 and 56 have a function of lowering the contact resistance between the underlying semiconductor layer 40 and the overlying source and drain electrodes 65 and 66.

A passivation layer 70 is formed on the data line assembly and the semiconductor layer 40 with silicon nitride. The passivation layer 70 has contact holes 76 and 78 exposing the drain electrodes 66 and the data pads 68, and contact holes 74 exposing the gate pads 24 together with the gate insulating layer 30. Furthermore, the passivation layer 70 has contact holes 71 exposing the second data pad connectors 61, and contact holes 72 exposing the first data pad connectors 21 together with the gate insulating layer 30.

Pixel electrodes 82 are formed on the passivation layer 70 to receive picture signals from the thin film transistors and generate electric fields together with a common electrode formed at the counter substrate. The pixel electrodes 82 are formed with a transparent conductive material such as indium tin oxide (ITO) and indium zinc oxide (IZO). The pixel electrodes 82 are physico-electrically connected to the drain electrodes 66 of the thin film transistors formed at the neighboring pixel rows through the contact holes 76 to receive picture signals. The pixel electrodes 80 at the same pixel row are overlapped with the front gate line to thereby form storage capacitors. In case the desired amount of storage capacity is not obtained, a storage capacitor line assembly may be formed in a separate manner.

The pixel electrodes 82 at the neighboring blue pixel rows B1 and B2 are connected to each other by way of first and second pixel electrode connectors 851 and 852, respectively. The pixel electrodes 82 at the neighboring blue pixel rows B1 and B2 are connected to the thin film transistors, which are alternately arranged at the neighboring blue pixel columns one by one with respect to the two blue pixel rows. The second pixel electrode connectors 852 at the B region are overlapped with the front gate line 22. However, the first pixel electrode connectors 851 placed at the A region to interconnect the pixel electrodes 82 at the blue pixels B1 are overlapped with the gate line 22 corresponding thereto. Consequently, parasitic capacitance is made due to the overlapping of the first pixel electrode connectors 851 and the gate line 22 corresponding thereto. This causes kick-back voltages, which deteriorate the pixel voltages applied to the relevant pixel electrodes 82. Furthermore, brightness difference is made between the neighboring blue pixel columns.

In order to solve such a problem, in the structure where the storage capacity is formed through overlapping the gate line 22 with the pixel electrodes 82, the storage capacity should be formed in a uniform manner. For this purpose, at the A region, the area of overlapping the first pixel electrode connectors 851 and the gate line 22 should be optimized such that the parasitic capacitance due to the overlapping thereof be 5% or less of the sum of the liquid crystal capacitance and the storage capacitance of the relevant pixels. The reason is that in case the parasitic capacitance between the first pixel electrode connectors 851 and the gate line 22 exceeds 5% of the sum of the liquid crystal capacitance and the storage capacitance of the relevant pixels, the kick-back voltage is increased by 1V or more so that the brightness difference is made among the pixels in a serious manner.

Meanwhile, subsidiary gate pads 84 and subsidiary data pads 88 are selectively formed at the same plane as the pixel electrodes 82 while being connected to the gate and the data pads 24 and 68 through the contact holes 74 and 78 of the passivation layer 70 and the gate insulating layer 30. The subsidiary gate and data pads 84 and 88 may be selectively introduced.

Third data pad connectors 81 are formed at the same plane as the pixel electrodes 82 to electrically interconnect the data lines 62 for transmitting data signals to the neighboring blue pixel columns B1 and B2 by way of one data pad 68. The two second data pad connectors 61 connected to the data lines 62 to transmit data signals to the two neighboring blue pixel columns B1 and B2 as well as the first data pad connectors 21 positioned close thereto are connected to the third data pad connectors 81 through the contact holes 71 and 72. The third data pad connectors 81 cross over the data lines for the red and green pixel neighbors R and G in an insulating manner while electrically interconnecting the two data lines 62 for the neighboring blue pixels by way of one data pad 68.

When the data lines 62 at the neighboring blue pixels B1 and B2 are connected to each other by way of one data pad 68 while using the first to the third data pad connectors 21, 61 and 81, additional resistance may be made during the transmission of the data signals due to the contact resistance at the contact holes 71 and 72 and the wiring resistance at the first to the third data pad connectors 21, 61 and 81. It is preferable that the additional load resistance by way of the addition of the connectors is established to be 20% or less of the total load resistance of the data lines 62. The reason is that in case the additional load resistance exceeds 20% of the total load resistance of the data lines 62, the pixel storage capacity becomes reduced to be 5% or more, and this deteriorates the display characteristic.

Meanwhile, in the structure shown in FIGS. 1 to 3, the third data pad connectors 81 formed at the same plane as the pixel electrodes 82 are used as the connectors for interconnecting the data lines for transmitting the data signals to the two blue pixels B1 and B2 by way of one pad. Alternatively, the second data pad connectors may be used for that purpose. The structure of such connectors will be now explained with reference to FIGS. 4 and 5.

Figure 4:
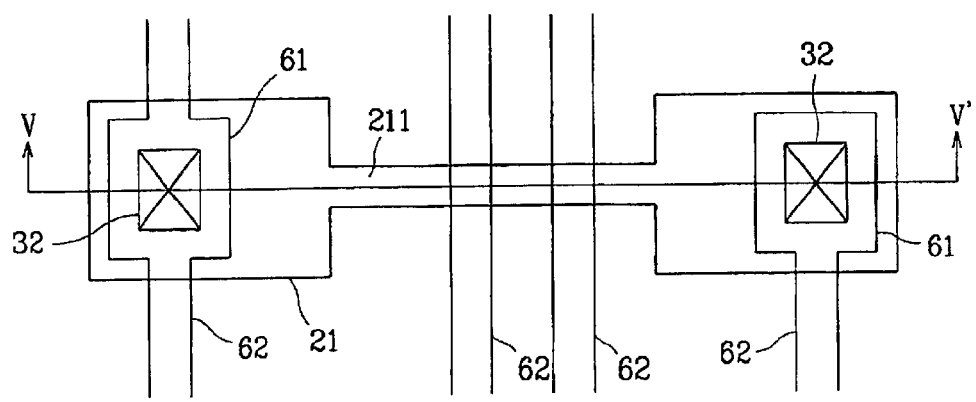
FIG. 4 is a plan view of a thin film transistor array substrate for a liquid crystal display according to a second preferred embodiment of the present invention.
Figure 5:
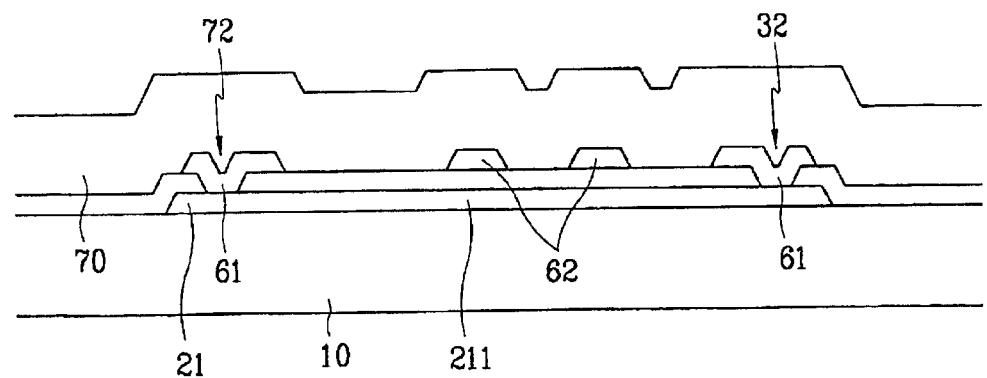
FIG. 5 is a cross sectional view of the thin film transistor array substrate taken along the V–V' line of FIG. 4.

FIG. 4 is a plan view of a thin film transistor array substrate for a liquid crystal display according to a second preferred embodiment of the present invention illustrating the data pad connectors, and FIG. 5 is a cross sectional view of the thin film transistor array substrate taken along the V–V' line of FIG. 4.

As shown in FIGS. 4 and 5, two first data pad connectors 21 for interconnecting the data lines 62 at the neighboring blue pixels are connected to each other by way of an interconnection pattern 211. The gate insulating layer 30 has contact holes 32 exposing the two first data pad connectors 21, respectively. The two data lines 62 for transmitting data signals to the neighboring blue pixels are electrically connected to each other such that the second data pad connectors 61 connected thereto are connected to the first data pad connectors 21 through the contact holes 32.

In addition to the transparent conductive material such as ITO and IZO, a reflective conductive material such as aluminum, aluminum alloy, silver and silver alloy may be used to form the pixel electrodes 82.

The above structure similar to the Pentile Matrix pixel arrangement structure is easily applied for use in displaying picture images or the shape of a circle and a diagonal line while making the expression of a letter or a device so that the resolution of the UXGA degree can be realized with the pixel arrangement of SVGA while decreasing the number of the data pads 68. In this way, the number of high cost data driving ICs can be decreased while minimizing the cost involved in designing the display device. Furthermore, the data lines for transmitting the data signals to the blue pixels are formed with the same shape as the data lines for transmitting the data signals to the red and green pixels while preventing the display characteristic from being deteriorated in a non-uniform manner. Furthermore, the desired amount of storage capacity is obtained with the overlapping of the front gate lines and the pixel electrodes, and the parasitic capacitance due to the overlapping of the pixel electrode connectors and the gate line corresponding thereto is optimized so that the storage capacity can be formed in a uniform manner. In addition, the data lines are arranged at the red or green pixels while interposing the unit pixels so that the short circuit between the neighboring data lines can be prevented. Furthermore, when the neighboring blue pixels are driven using one driving IC, the data driving ICs may be arranged at one-sided area around the display area using the data pad connectors so -that the display device can be optimized in size. In this way, repair lines for repairing the cutting or short-circuiting of the wiring lines can be easily formed at the periphery of the display area.

Figure 6:
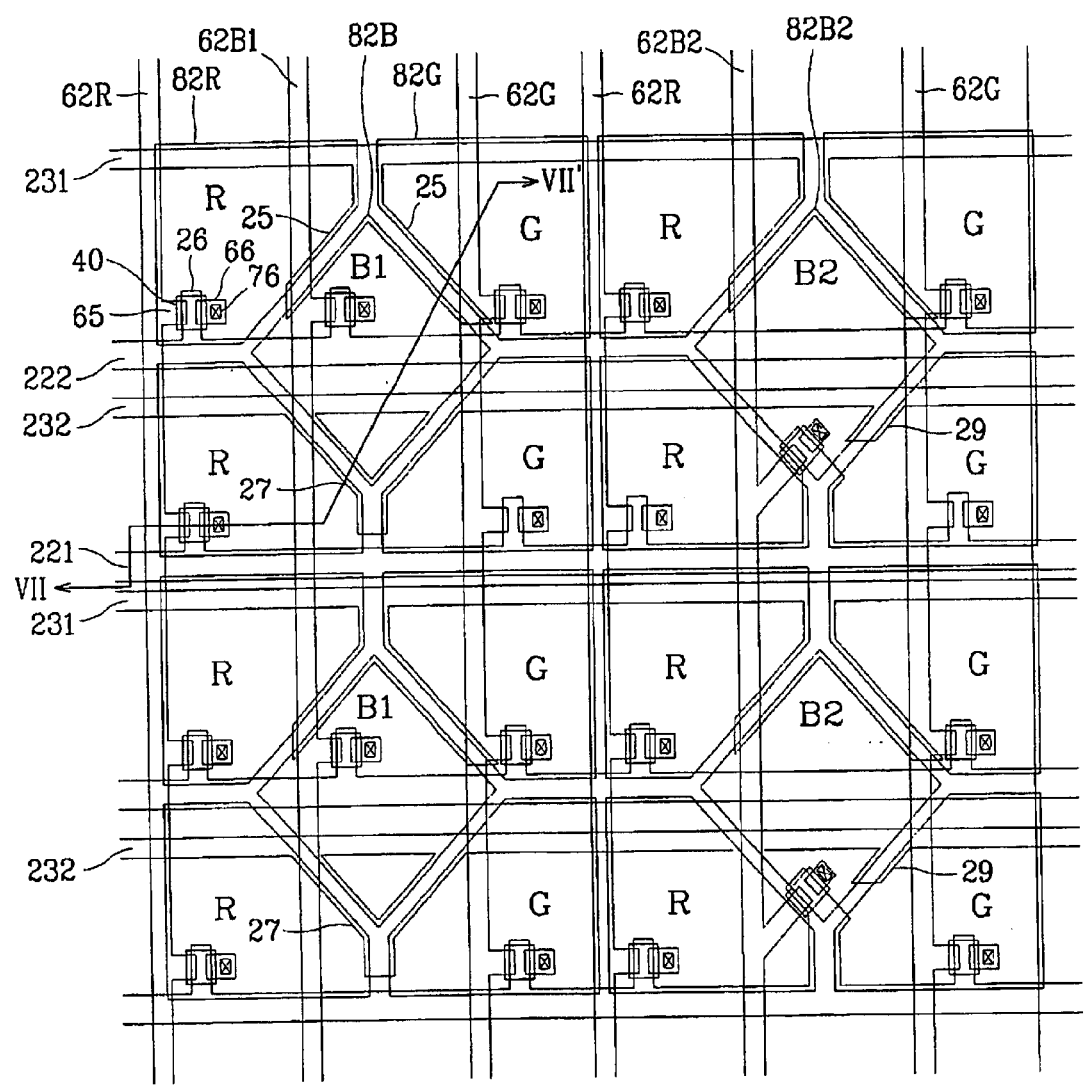
FIG. 6 is a plan view of a thin film transistor array substrate for a liquid crystal display according to a third preferred embodiment of the present invention.
Figure 7:
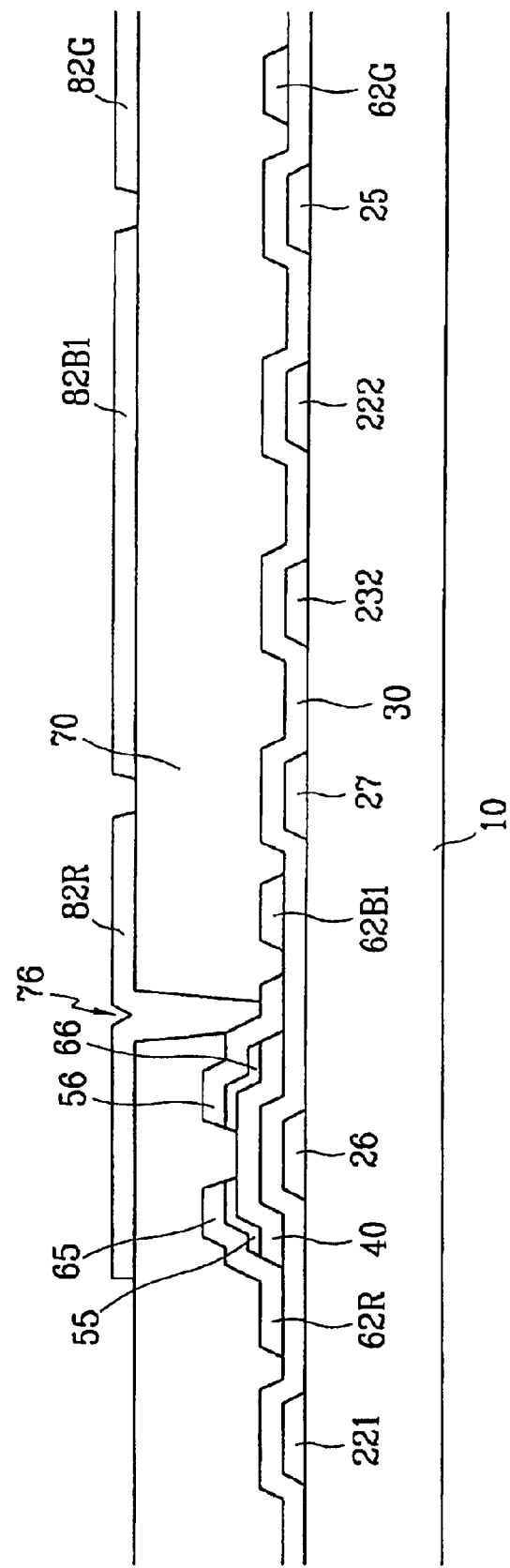
FIG. 7 is a cross sectional view of the liquid crystal display taken along the VII–VII' line of FIG. 6.

FIG. 6 is a plan view of a thin film transistor array substrate for a liquid crystal display according to a third preferred embodiment of the present invention, and FIG. 7 is a cross sectional view of the thin film transistor array substrate taken along the VII–VII' line of FIG. 6.

As shown in FIG. 6, the pixels of red, blue and green color filters R, B1, G, R, B2 and G are arranged at the substrate in the Pentile Matrix form. The pixels of red, blue and green R, B1, G, R, B2 and G are sequentially arranged in the row direction with the same color pixel neighbors in the column direction. The blue pixels B1 and B2 are formed with a diamond shape. The four pixels of red and green R and G are arranged at the four sides of the diamond-shaped blue pixels B1 and B2, respectively.

Gate lines or scanning lines 221 and 222 are formed at the respective pixel rows one by one while proceeding in the horizontal direction, and data lines 62R, 62B1, 62G, 62R, 62B2 and 62G cross over the gate lines 221 and 222 while proceeding in the vertical direction. Furthermore, pixel electrodes 82R, 82B1, 82G, 82R, 82B2 and 82G are formed at the respective pixels R, B1, G, R, B2 and G such that picture signals are transmitted thereto through the data lines 62R, 62B1, 62G, 62R, 62B2 and 62G. A storage capacitor line assembly is overlapped with the pixel electrodes 82R, 82B1, 82G, 82R, 82B2 and 82G. The storage capacitor line assembly has first storage capacitor lines 231 and 232 proceeding in the horizontal direction, and second storage capacitor lines 25, 27 and 29 extended from the first storage capacitor lines 231 and 232 along the sides of the pixel electrodes 82B1 and 82B2 at the blue pixels. Thin film transistors including gate electrodes 26, source electrodes 65 and drain electrodes 66 are formed at the respective pixels such that they are connected to the gate lines 221 and 222, the data lines 62R, 62B1, 62G, 62R, 62B2 and 62G, and the pixel electrodes 82R, 82B1, 82G, 82R, 82B2 and 82G.

Specifically, a gate line assembly and a storage capacitor line assembly are formed on a transparent insulating substrate 10. The gate line assembly includes scanning lines or gate lines 221 and 222 proceeding in the horizontal direction, and gate electrodes 26 connected to the gate lines 22. The gate line assembly may further include gate pads connected to the ends of the gate lines 221 and 222. The gate electrodes 26 connected to the gate line 221 are formed only at the blue pixel columns B1, and the gate electrodes 26 connected to the other gate line 222 are formed only at the blue pixel columns B2. The storage capacitor line assembly includes first storage capacitor lines 231 and 232 proceeding in the horizontal direction while being alternated with the gate lines 221 and 222, and second storage capacitor lines 25, 27 and 29 extended from the first storage capacitor lines 231 and 232 along the boundaries of the pixels of red, blue and green R, B1, G, R, B2 and G. The storage capacitor line assembly is overlapped with the pixel electrodes 82R, 82B1, 82G, 82R, 82B2 and 82G of the pixels R, B1, G, R, B2 and G to thereby form storage capacitors. The two neighboring gate lines 221 and 222 are spaced apart from each other at both sides of the first storage capacitor lines 231 and 232 while preventing the gate line assembly from being short-circuited.

A gate insulating layer 30 covers the gate line assembly and the storage capacitor line assembly, and a data line assembly is formed on the gate insulating layer 30 with a low resistance conductive material. The data line assembly includes data lines 62R, 62B1, 62G, 62R, 62B2 and 62G formed at the pixels of red, blue and green R, B1, G, R, B2 and G one by one while proceeding in the vertical direction, source electrodes 65 connected to the data lines, and drain electrodes 66 facing the source electrodes 65 around the gate electrodes 26. The data line assembly may further include data pads connected to the one-sided ends of the data lines to receive picture signals from the outside.

The data lines 62R at the red pixel columns R are placed at the boundary of the red and green pixels, the data lines 62B1 and 62B2 at the blue pixel columns B1 and B2 are placed at the center of the red and blue pixel columns. The data lines 62G at the green pixel columns G are placed at the center of the green pixel columns. Accordingly, the data lines 62R, 62B1, 62G, 62R, 62B2 and 62G at the respective pixel columns are spaced apart from each other with a predetermined distance while preventing the data lines 62R, 62B1, 62G, 62R, 62B2 and 62G from being short-circuited. Furthermore, the interference of the data signals applied to the data lines can be also prevented.

A passivation layer 70 is formed on the data line assembly and the semiconductor layer 40 with silicon nitride or an acryl-based organic insulating material. Pixel electrodes 82R, 82B1, 82G, 82R, 82B2 and 82G are formed on the passivation layer 70 at the respective pixels R, B1, G, R, B2 and G while being connected to the drain electrodes 76 through the contact holes 76.

Of course, the above structure involves a data pad connection structure where the data lines at the two neighboring pixels-are connected to each other by way of a data pad.

The desired amount of storage capacity is obtained by way of a storage capacitor line assembly while involving a Pentile Matrix pixel arrangement structure, and this enhances the display characteristic. The signal lines for transmitting gate and data signals to the neighboring pixel rows and columns are spaced apart from each other with a predetermined distance, and this prevents the wiring lines from being short-circuited. Furthermore, the data lines are placed at the center of the pixels with an optimum length so that the delay in signal transmission through the data lines can be uniformly made.

Meanwhile, such a structure where the signal line is placed at the center of the pixel may be well adapted for use in a reflective type liquid crystal display with pixel electrodes based on a reflective conductive material. The passivation layer 70 interposed between the data line assembly and the pixel electrodes is preferably made with an organic insulating material bearing a low dielectric constant. The passivation layer 70 may be surface-treated to bear prominent and depressed portions while heightening the light reflection rate. The passivation layer 70 may be formed with a colored insulating layer bearing a low light reflection and a low light transmission. In this way, the passivation layer 70 may have a function of a black matrix where the leakage of light between the neighboring pixels is intercepted or the light incident upon the semiconductor layer 40 is intercepted. Alternatively, the gate line assembly, the data line assembly and the storage capacitor line assembly may be varied in shape such that they function as a black matrix for intercepting the leakage of light between the pixels.

Meanwhile, in the method of driving a liquid crystal display, the picture signals applied to the pixel electrode may repeatedly become positive and negative with respect to the common electrode to prevent the liquid crystal from being deteriorated. Such a driving technique is called the "inversion-driving." In case the inverse polarity of the pixel is driven irregularly, the picture signal applied to the pixel electrode becomes seriously deformed while generating flicker. For this reason, the picture quality of the liquid crystal display is liable to be deteriorated. In order to solve such a problem, in the Pentile Matrix pixel arrangement structure where the red, blue and green pixel columns are sequentially arranged, the data lines at the blue pixel columns neighboring to each other in the first or second order are connected to each other by way of one pad, and the data lines at the red and green pixel columns between the blue pixel columns cross each other to transmit the picture signals.

Figure 8:
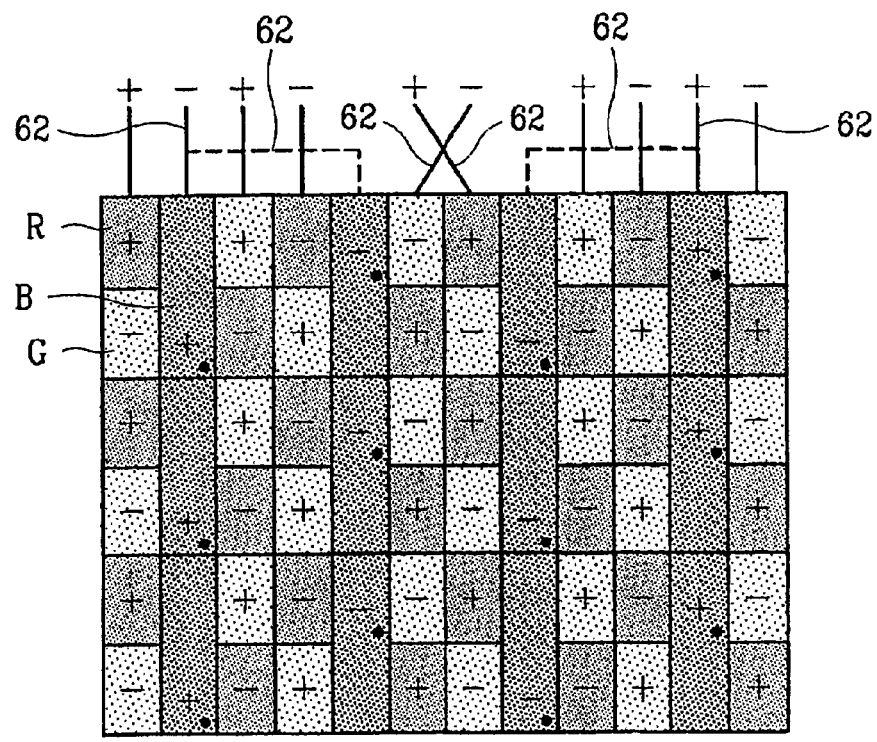
FIGS. 8 to 10 illustrate the structure of interconnecting wiring lines and the way of inversion-driving in liquid crystal displays according to fourth to sixth preferred embodiments of the present invention.
Figure 9:
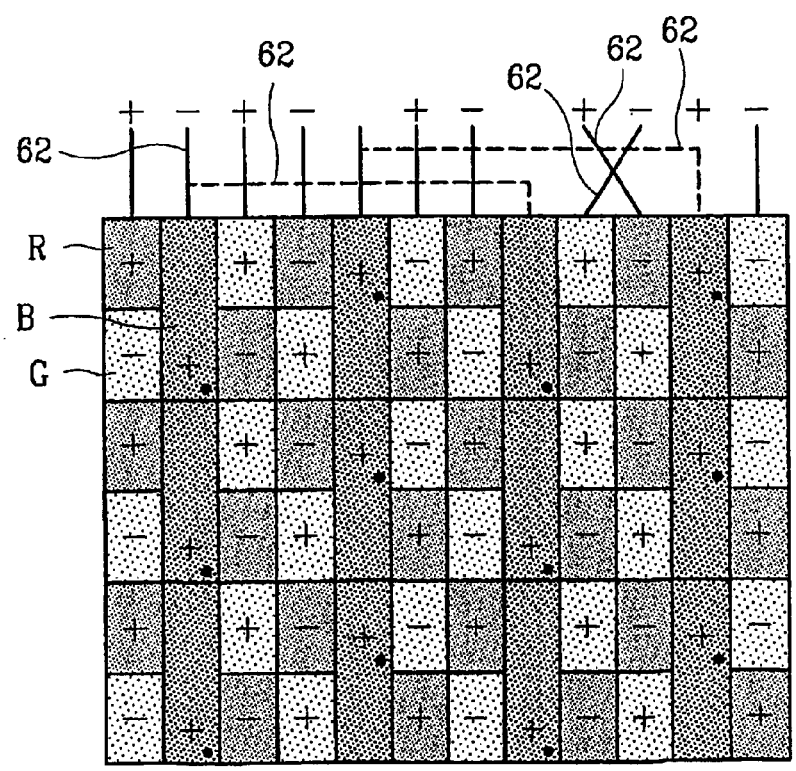
Figure 10:
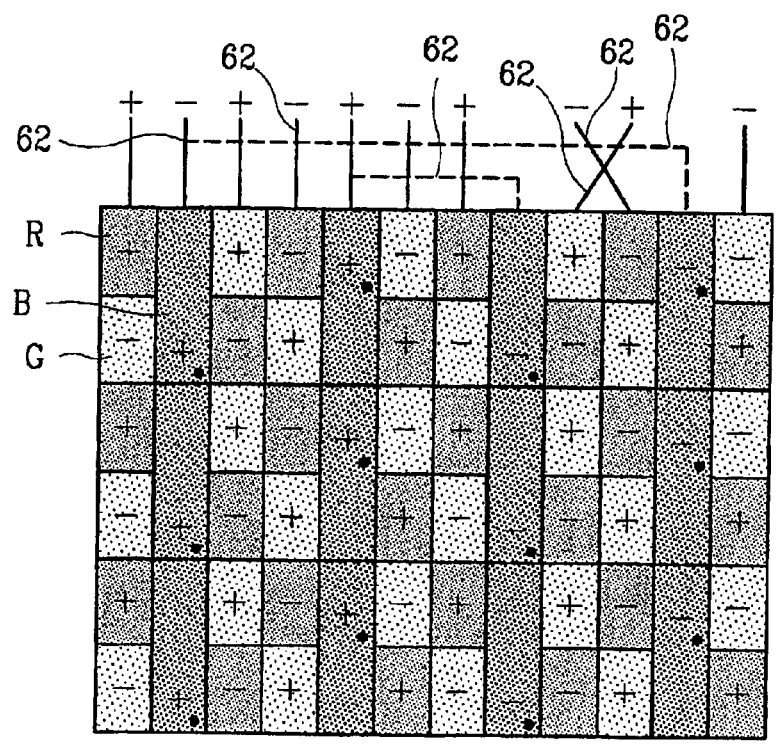

FIGS. 8 to 10 illustrate the way of inversion-driving and the wiring line connection structure in liquid crystal displays according to fourth to sixth preferred embodiment of the present invention. In the drawings, the symbol "○" indicates the position of the thin film transistor at the blue pixel column, and the symbols "+" and "−" indicate the polarity of the pixel voltage (picture signal) applied to the pixel electrode with respect to the common voltage applied to the common electrode.

As shown in FIGS. 8 to 10, in the liquid crystal displays according to the fourth to sixth preferred embodiments, the red, green and blue pixels are sequentially arranged in the row direction, and the red and green pixels are alternately arranged in the column direction. The blue pixel column is placed between the neighboring red and green pixel columns per two pixel rows. The four red and blue pixels surrounding the blue pixel at the left and right sides thereof face each other around the blue pixel color to color. In these preferred embodiments, twelve pixel columns are taken to be as a pixel arrangement unit.

As shown in FIG. 8, in the liquid crystal display according to the fourth preferred embodiment of the present invention, the data line 62 at the $(n+4)^{th}$ blue pixel column is electrically connected to the data line 62 at the $(n+1)^{th}$ blue pixel column such that the pixels at the $(n+4)^{th}$ blue pixel column receive the picture signals via the data pad connected to the data line 62 at the $(n+1)^{th}$ blue pixel column. The data line 62 at the $(n+7)^{th}$ blue pixel column is electrically connected to the data line 62 at the $(n+10)^{th}$ blue pixel column such that the pixels at the $(n+7)^{th}$ blue pixel column receive the picture signals via the data pad connected to the data line 62 at the $(n+10)^{th}$ blue pixel column. Furthermore, the data line 62 at the $(n+5)^{th}$ green pixel column cross the data line 62 at the $(n+6)^{th}$ red pixel column such that they transmit the picture signals to the pixels at the $(n+6)^{th}$ green pixel column and the $(n+5)^{th}$ red pixel column, respectively.

When the above-structured liquid crystal display is driven by way of dot inversion in the row and column directions, as shown in FIG. 8, the inversion driving is made while bearing the polarity sequence of +++, −−−, +−+ and −+− in the pixel row direction with respect to the entire area of the liquid crystal display panel.

As shown in FIG. 9, in the liquid crystal display according to the fifth preferred embodiment of the present invention, the data line 62 at the $(n+7)^{th}$ blue pixel column is electrically connected to the data line 62 at the $(n+1)^{th}$ blue pixel column such that the pixels at the $(n+7)^{th}$ blue pixel column receive the picture signals via the data pad connected to the data line 62 at the $(n+1)^{th}$ blue pixel column. The data line 62 at the $(n+10)^{th}$ blue pixel column is electrically connected to the data line 62 at the $(n+4)^{th}$ blue pixel column such that the pixels at the $(n+10)^{th}$ blue pixel column receive the picture signals via the data pad connected to the data line 62 at the $(n+4)^{th}$ blue pixel column. Furthermore, the data line 62 at the $(n+8)^{th}$ green pixel column cross the data line 62 at the $(n+9)^{th}$ red pixel column such that they transmit the picture signals to the pixels at the $(n+9)^{th}$ green pixel column and the $(n+8)^{th}$ red pixel column, respectively.

When the above-structured liquid crystal display is driven by way of dot inversion in the row and column directions, as shown in FIG. 9, the inversion driving is made while bearing the polarity sequence of +++ and −+− in the pixel row direction with respect to the entire area of the liquid crystal display panel.

As shown in FIG. 10, in the liquid crystal display according to the sixth preferred embodiment of the present invention, the data line 62 at the $(n+10)^{th}$ blue pixel column is electrically connected to the data line 62 at the $(n+1)^{th}$ blue pixel column such that the pixels at the $(n+10)^{th}$ blue pixel column receive the picture signals via the data pad connected to the data line 62 at the $(n+1)^{th}$ blue pixel column. The data line 62 at the $(n+7)^{th}$ blue pixel column is electrically connected to the data line 62 at the $(n+4)^{th}$ blue pixel column such that the pixels at the $(n+7)^{th}$ blue pixel column receive the picture signals via the data pad connected to the data line 62 at the $(n+4)^{th}$ blue pixel column. Furthermore, the data line 62 at the $(n+8)^{th}$ green pixel column cross the data line 62 at the $(n+9)^{th}$ red pixel column such that they transmit the picture signals to the pixels at the $(n+9)^{th}$ green pixel column and the $(n+8)^{th}$ red pixel column, respectively.

When the above-structured liquid crystal display is driven by way of dot inversion in the row and column directions, as shown in FIG. 10, the inversion driving is made while bearing the polarity sequence of +++, −+−, +−+ and −−− in the pixel row direction with respect to the entire area of the liquid crystal display panel.

In the way of driving the liquid crystal display according to the fifth preferred embodiment of the present invention, the inversion driving may be made by way of dot inversion while bearing the polarity sequence of +++ and −+− in the pixel row direction. However, the driving is liable to be made in the pixel column direction by way of frame inversion while generating the flicker phenomenon. In order to solve such a problem, column inversion driving may be made in the row direction, or two-dot inversion may be made in the column direction.

Figure 11:
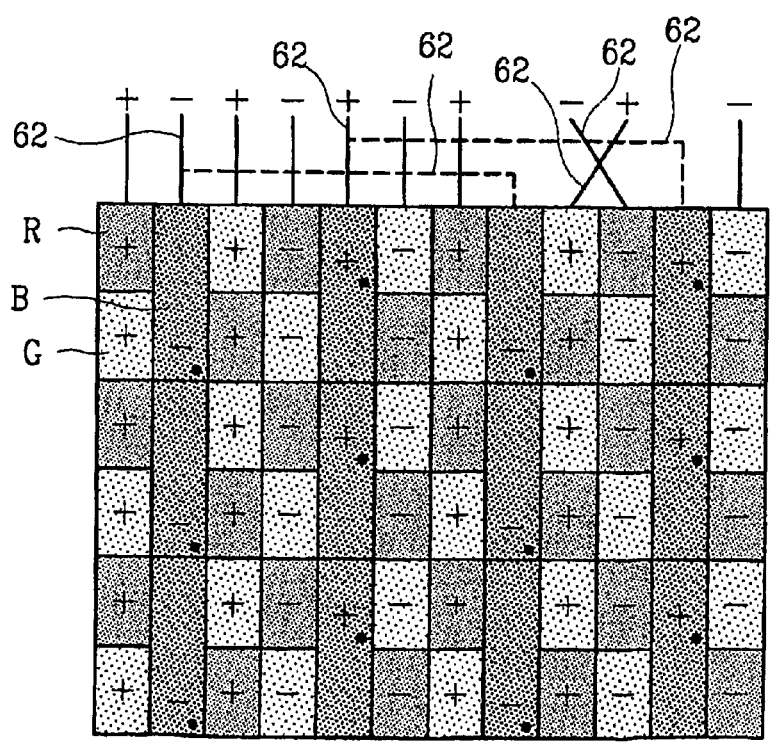
FIGS. 11 and 12 illustrate the column inversion driving and the two-dot inversion driving in the liquid crystal display according to the fifth preferred embodiment.
Figure 12:
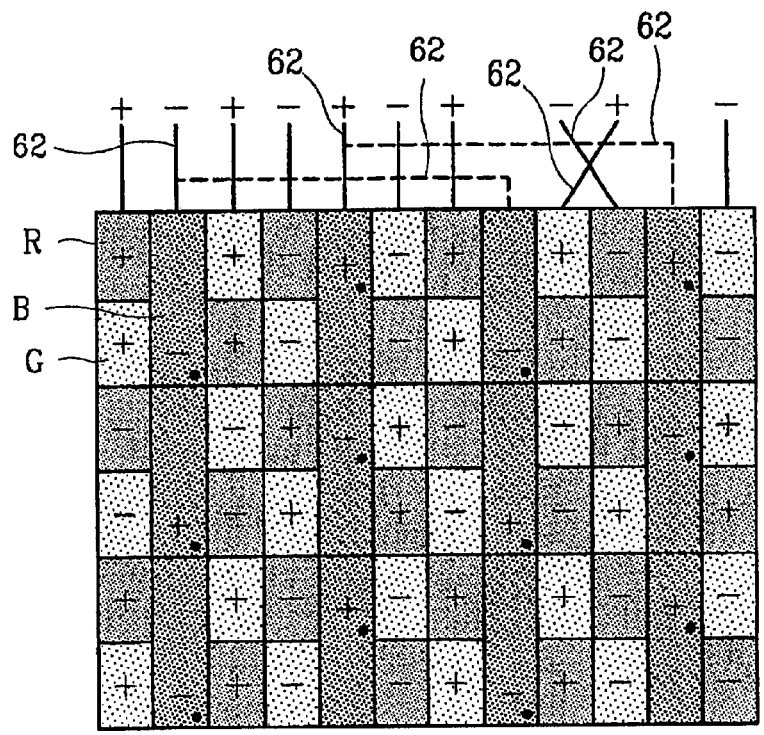

FIGS. 11 and 12 illustrate the way of making the column inversion driving and the two-dot inversion driving in the liquid crystal display according to the fifth preferred embodiment of the present invention.

As shown in FIG. 11, in the way of driving the liquid crystal display according to the fifth preferred embodiment of the present invention, when the column inversion is made in the row direction, the liquid crystal device is driven by way of color inversion in the blue pixel row or column direction.

As shown in FIG. 12, when the two-dot inversion driving is made in the column direction, the blue pixels can involve uniform dot inversion in the column and row directions.

Meanwhile, in the structure of the thin film transistor array substrate for the liquid crystal display according to the first preferred embodiment, the difference in the liquid crystal capacitance between the neighboring blue pixel columns B1 and B2 is liable to be made while deteriorating the display characteristic. In order to solve such a problem, the area of overlapping between the first pixel electrode connectors 851 and the gate line 22 for transmitting the gate signals to the corresponding pixels may be optimized. In order to remove the brightness difference between the neighboring two blue pixel columns, the first and the second pixel electrode connectors may be alternately arranged at the two neighboring pixel rows as with the thin film transistors such that they are not overlapped with the gate line for transmitting the gate signals to the corresponding pixel column.

Figure 13:
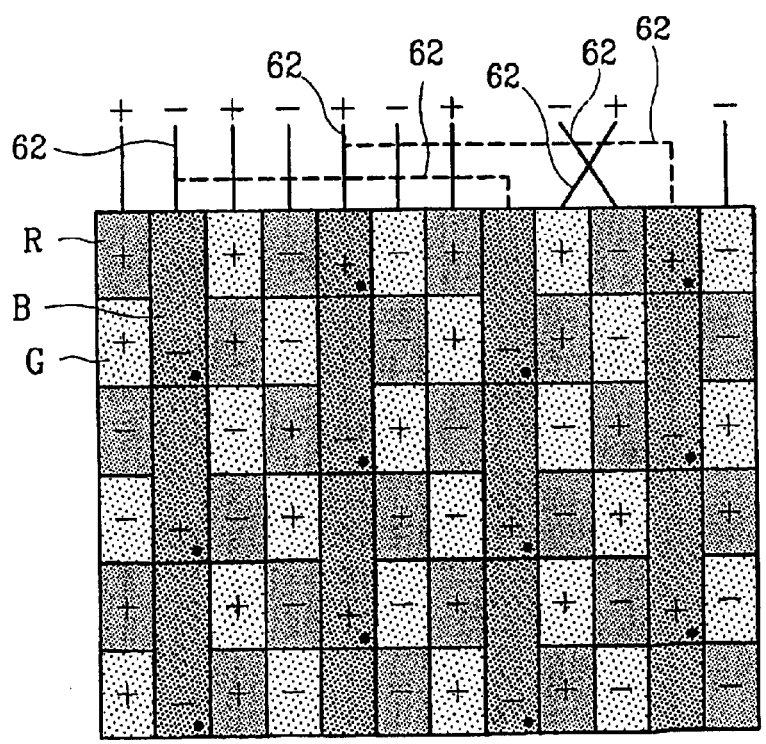
FIGS. 13 to 15 illustrate the way of dot inversion driving in liquid crystal displays according to seventh to ninth preferred embodiments of the present invention.
Figure 14:
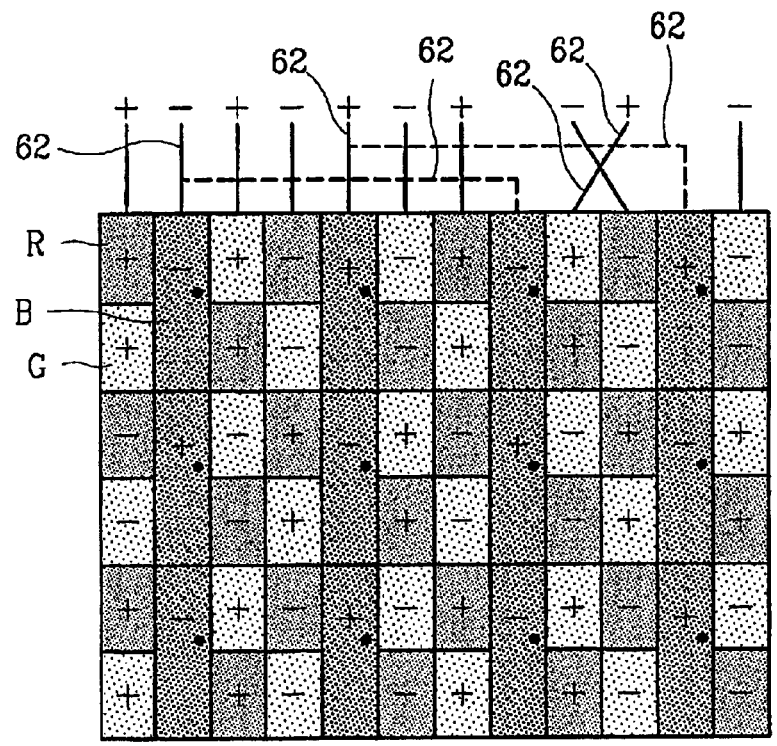
Figure 15:
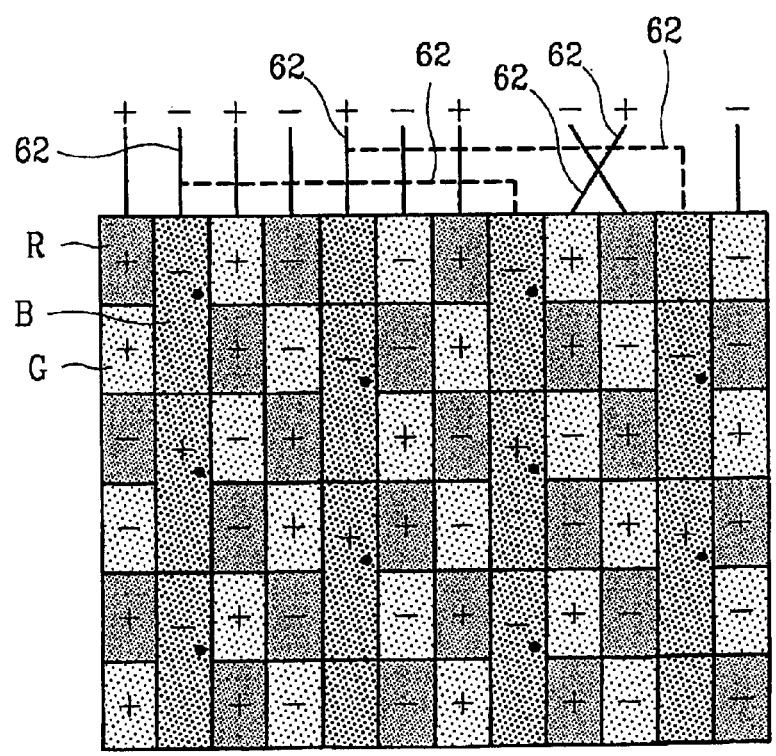

FIGS. 13 to 15 illustrate the way of dot inversion driving in liquid crystal displays according to seventh to ninth preferred embodiments of the present invention. The thin film transistor array substrates for the liquid crystal displays according to the seventh to the ninth preferred embodiments have the same component and structures as those of the thin film transistor shown in FIG. 1, and the pixel arrangement structures of the liquid crystal displays where two-dot inversion driving is made are illustrated in FIGS. 13 to 15.

In the first preferred embodiment, as shown in FIG. 1, the first and the second pixel electrode connectors 851 and 852 are overlapped with the same gate line 22. In the thin film transistor array substrate for the liquid crystal display according to the seventh preferred embodiment, the first and the second pixel electrode connectors are alternately arranged with respect to the two neighboring pixel rows as with the arrangement structure of the thin film transistors. The first pixel electrode connector is overlapped with the gate line neighboring to the gate line overlapped with the second pixel electrode connector such that the pixel electrodes at the two neighboring blue pixel rows are electrically connected to each other. In this structure, the pixel electrodes at the B1 and B2 pixels have the same structure. As shown in FIG. 13, the two pixels are arranged to move by the distance of ½ of one pixel. The thin film transistor at the blue pixel is only positioned at the periphery of the pixel.

As shown in FIG. 13, when the two-dot inversion is made using the structure according to the seventh preferred embodiment, uniform inversion driving can be made, and the first and the second pixel electrode connectors can be entirely overlapped with the gate line for transmitting the scanning signals to the neighboring front pixels so that the brightness difference made at the blue pixels can be eradicated.

In the liquid crystal display according to the seventh preferred embodiment, the first and the second pixel electrode connectors are overlapped with the gate line at the front pixel row to eradicate the brightness difference between the blue pixel columns. By contrast, in the liquid crystal display according to the eighth preferred embodiment, the second pixel electrode connector at the B2 pixel is overlapped with the gate line at the corresponding pixel column as with the B1 pixel shown in FIG. 1. In this case, as shown in FIG. 14, the first and the second pixel electrode connectors are placed at the center of the pixel while the thin film transistor being placed at the one-sided portion of the blue pixel. However, in the structure according to the eighth preferred embodiment, the thin film transistor is connected to only one of the gate lines at the two neighboring pixel rows, and signal delay is seriously made at the gate line connected to the thin film transistor so that difference in the signal transmission between the gate lines is resulted to a large scale. In order to solve such a problem, as shown in FIG. 15, the blue pixels at the neighboring pixel columns may be arranged to move by the distance of ½ of the pixel.

Meanwhile, as with the fourth to the ninth preferred embodiments, when the data lines 62 cross each other to cross-transmit the picture signals to the neighboring red and green pixel columns, it is preferable that the data line cross-connection lines are formed at the same plane as the data lines and the pixel electrodes (as with the first to the third preferred embodiments). This will be now explained with reference to FIGS. 16 and 17.

Figure 16:
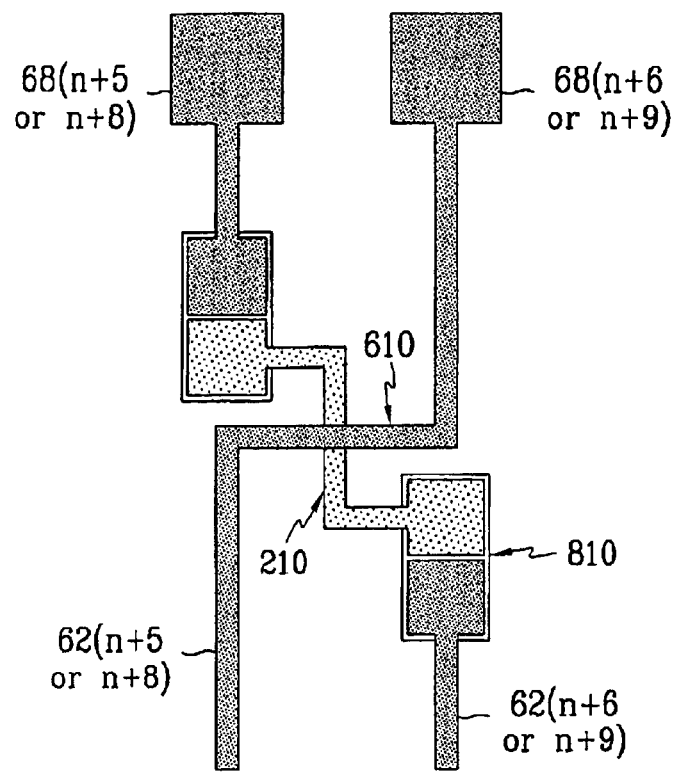
FIGS. 16 and 17 are plan views of data line cross-connection units for the liquid crystal displays according to the fourth to the ninth preferred embodiments of the present invention.
Figure 17:
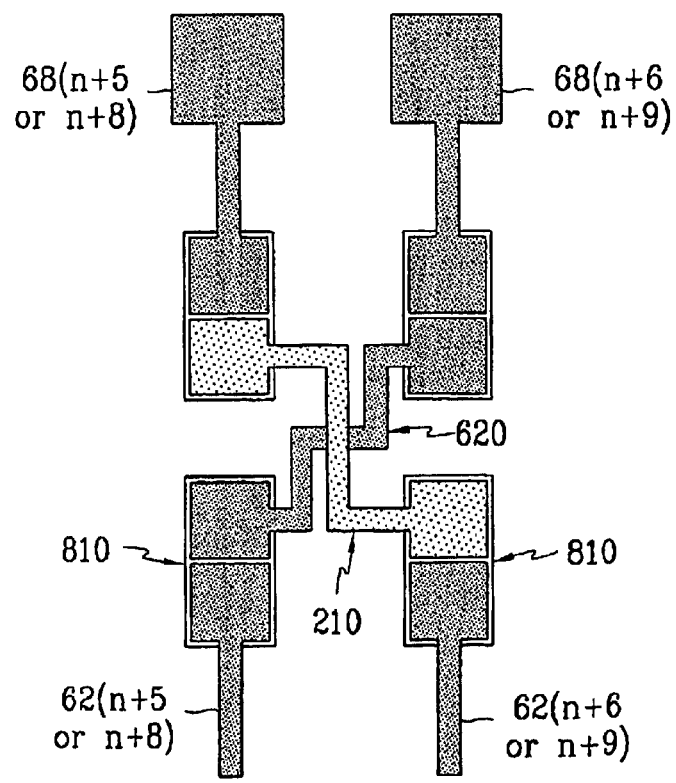

FIGS. 16 and 17 illustrate the data line cross-connection units in the liquid crystal displays according to the fourth to the ninth preferred embodiments of the present invention. The reference numeral 210 indicates the first cross-connection line formed at the same plane as the gate line assembly. The reference numerals 610 and 620 indicate the second cross-connection line formed at the same plane as the data line assembly. The reference numeral 810 indicates the third cross-connection line formed at the same plane as the pixel electrode.

As shown in FIG. 16, in the thin film transistor array substrate for the liquid crystal displays according to the fourth to the ninth preferred embodiments, the $(n+5)^{th}$ and $(n+6)^{th}$ data lines 62 or the $(n+8)^{th}$ and $(n+9)^{th}$ data lines 62 for transmitting the picture signals to the red and the green pixel columns proceed parallel to each other, and a data pad 68 is cross-connected to the respective data lines 62. The second cross-connection line 610 is bent such that it electrically connects the $(n+6)^{th}$ and $(n+9)^{th}$ data pads 68 to the $(n+5)^{th}$ and $(n+8)^{th}$ data lines 62, respectively. The first cross-connection line 210 and the third cross-connection line 810 connect the $(n+5)^{th}$ and $(n+8)^{th}$ data pads 68 to the $(n+6)^{th}$ and $(n+9)^{th}$ data lines 62, respectively. The first cross-connection line 210 is formed at the same plane as the gate line assembly while being bent such that it crosses the second cross-connection line 610. The third cross-connection line 810 electrically connects the first cross-connection line 210 to the data line 62 through the contact hole 700 formed at the gate insulating layer 30 shown in FIG. 2 or at the passivation layer 70 shown in FIG. 2.

FIG. 17 illustrates the structure where the second cross-connection line 610 shown in FIG. 16 is changed like the first cross-connection line 210 to make uniform the contact resistance at the data line cross-connection unit. As shown in FIG. 17, the second cross-connection line 620 interconnects the third cross-connection lines 810 connected to the neighboring data line 62 and data pad 68 through the contact holes 700 formed at the gate insulating layer 30 shown in FIG. 2 or at the passivation layer 70 shown in FIG. 2.

Furthermore, as the data line for transmitting the picture signals to the red and green pixel columns while bearing the data line cross-connection unit involves contact portions between the first and the second cross-connection lines or between the second and the third cross-connection lines, it differs in the linear resistance from other data lines, and this deteriorates the display characteristic of the liquid crystal display. In order to solve such a problem, the difference in the linear resistance between the data lines should be totally minimized. For this purpose, connectors are preferably formed at the respective data lines. This will be now explained with reference to FIG. 18.

Figure 18:
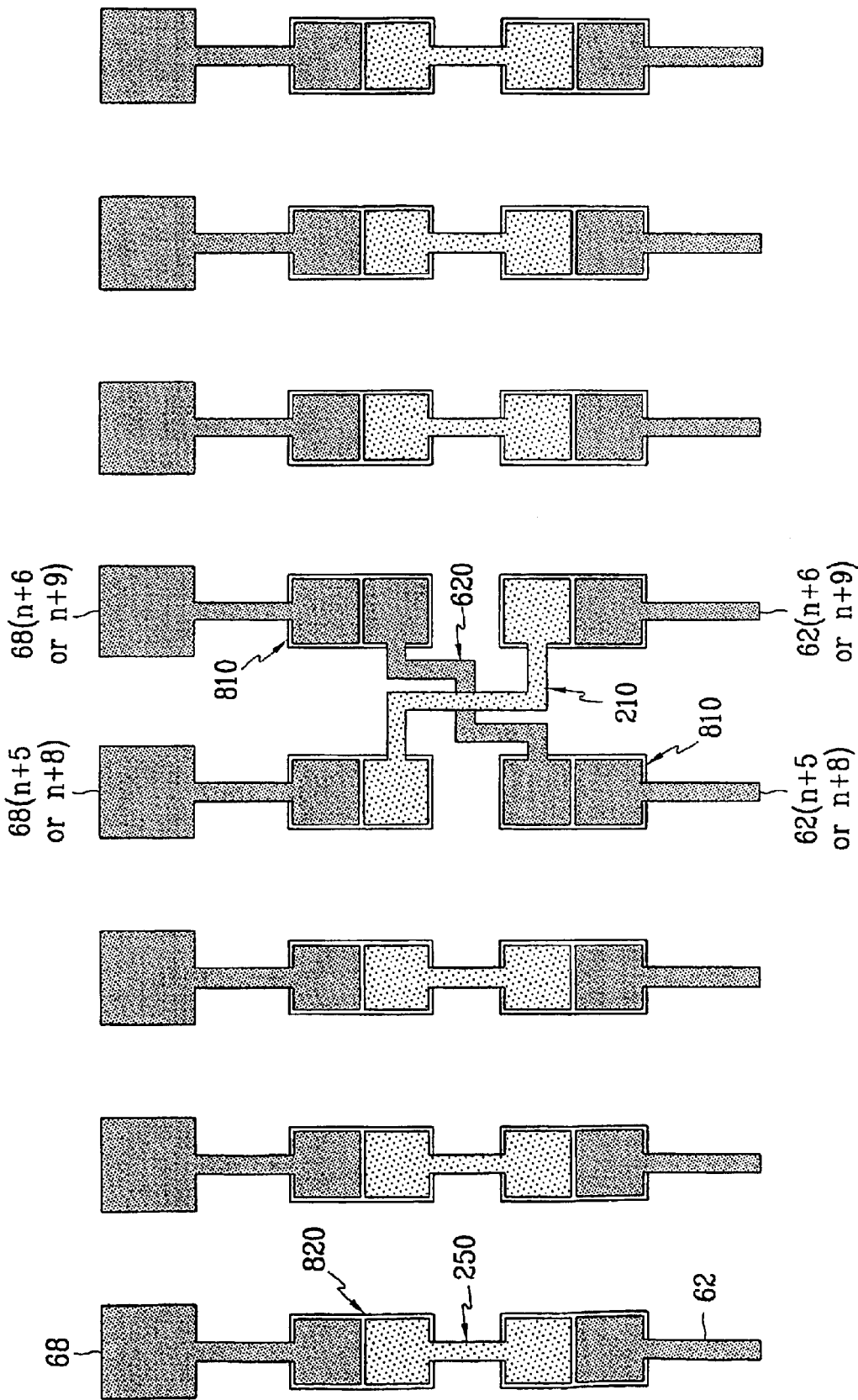
FIG. 18 is a plan view of a data line connection unit and a data line cross-connection unit for the liquid crystal displays according to the fourth to the ninth preferred embodiment of the present invention.

FIG. 18 illustrates the data line connection unit and the data line cross-connection unit in the thin film transistor array substrate for the liquid crystal displays according to the fourth to the ninth preferred embodiments of the present invention.

As shown in FIG. 18, each data line 62 is connected to the data pad 68 through a first connection line 250 formed at the same plane as the gate line assembly, and a second connection line 820 formed at the same plane as the pixel electrode.

In this structure, each data line 62 is connected to the data pad via two contact portions, and hence, all of the data lines 62 involve uniform linear resistance. In this way, the display device is prevented from being deteriorated in the display characteristic.

Meanwhile, in order to express high resolution picture images with the liquid crystal display bearing the Pentile Matrix pixel arrangement structure, the rendering technique may be used for the driving. The rendering driving technique refers to the technique where the red, green and blue pixels are individually driven while driving the pixels positioned close to the target pixel such that the brightness is diffused around the pixels while expressing the set thereof as one dot. In this way, the inclined line or the curved line can be expressed in clear and distinct manners while elevating the resolution.

A black matrix is formed in-between the respective pixels to intercept leakage of light, and the display portion corresponding to the black matrix is expressed to be black. For this reason, the black matrix area cannot be controlled in the brightness by way of the rendering technique while incurring the phase error. In order to solve such a problem, the width of the black matrix is minimized such that the black matrix takes a minimal area between the pixels. For this purpose, the pixel electrodes 82, 82R, 82G, 82B1 and 82B2 shown in FIGS. 1 and 6 involve maximized dimension within the unit pixel such that the periphery of the pixel electrode should be overlapped with the periphery of the gate line 22 and the data line 62. In the structure shown in FIG. 1, it is possible that the gate line 22 is formed with one wiring line while omitting the gate line connector 27. As shown in FIG. 2, it is also possible that a separate storage capacitor line assembly may be added. However, as the pixel electrodes are overlapped with the data lines 82, parasitic capacitance is generated with the passivation layer 70 interposed between them so that the data signals transmitted through the data lines 62 are liable to be deformed. In order to solve such a problem, the passivation layer 70 is formed with an acryl-based organic insulating material bearing a low dielectric constant and a good flattening characteristic through chemical vapor deposition. For instance, the passivation layer 70 may be formed with a low dielectric insulating material bearing a low dielectric constant of 4.0 or less such as SiOC and SiOF. In this way, the pixel electrode may be maximized in size within the pixel so that high aperture ratio can be obtained while minimizing the width of the black matrix for intercepting the leakage of light in-between the pixels. When the area of the black matrix is minimized, the brightness is increased while improving the color representation so that the rendering can be made more correctly.

Meanwhile, in the thin film transistor array substrate for the liquid crystal displays according to the first to the ninth preferred embodiments, the pixel electrodes at the neighboring blue pixel rows are connected to each is other, or the data lines at the neighboring blue pixels are connected to one pad. Furthermore, various wiring line structures as well as various wiring line connection structures are introduced for the thin film transistor array substrate. In order to easily make the inversion driving or the rendering as well as to simplify the data line assembly structure, a data pad is connected to each data line to transmit the data signals thereto. This will be now explained in detail.

Figure 19:
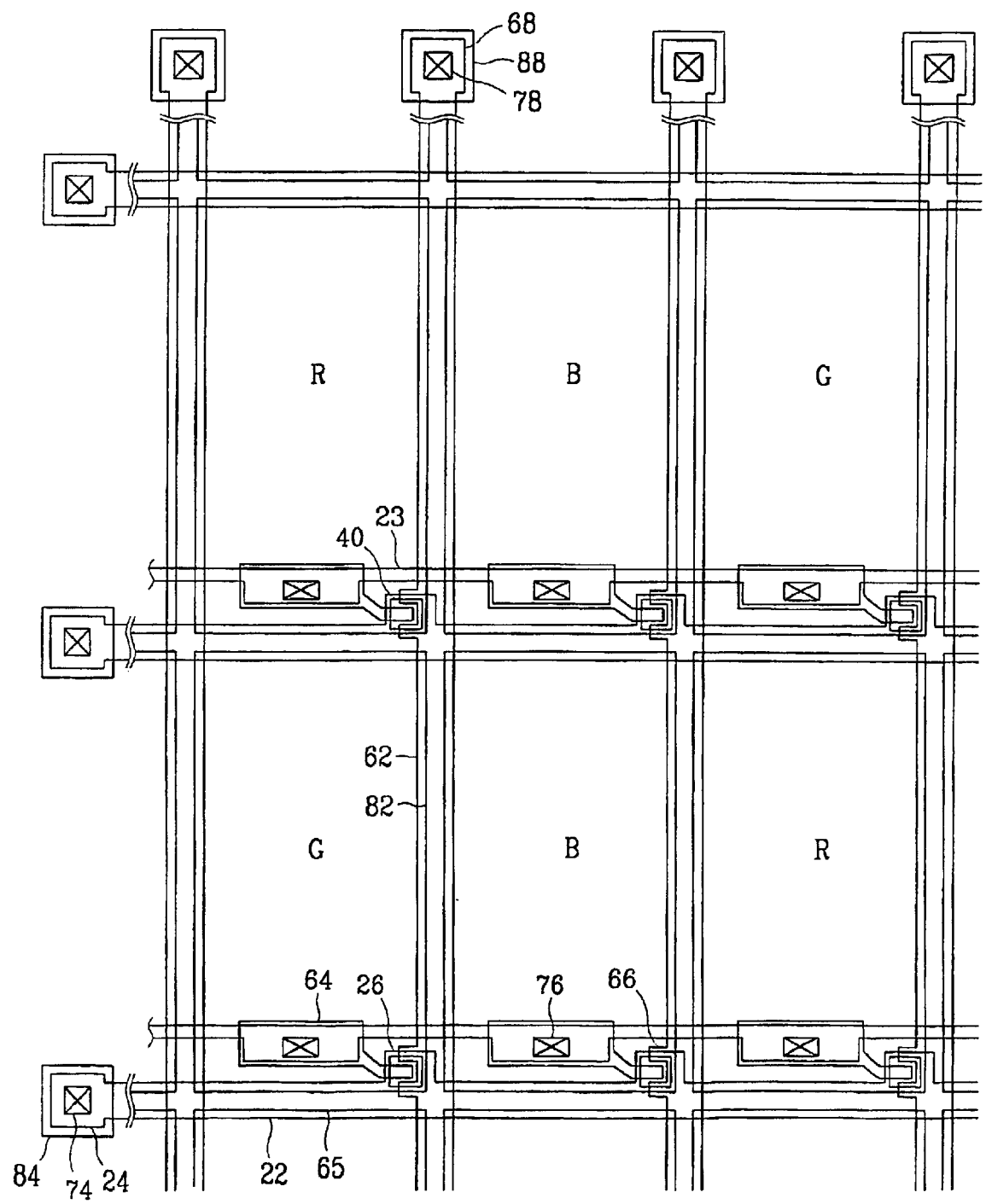
FIG. 19 is a plan view of a liquid crystal display with a Pentile Matrix pixel arrangement structure according to a tenth preferred embodiment of the present invention.

FIG. 19 is a plan view of a liquid crystal display with a Pentile Matrix pixel arrangement structure according to a tenth preferred embodiment of the present invention.

As shown in FIG. 19, the pixels of red, blue and green R, B and G are arranged in a matrix form. The red, blue and green pixels R, B and G are sequentially arranged in the row direction, and the red and green pixels R and G are alternately arranged in the column direction while the blue pixels B being repeatedly arranged in the column direction. The red and green pixels at the two neighboring pixel rows diagonally face each other around the blue pixels B color to color. Gate lines or scanning signal lines 22 for transmitting scanning signals or gate signals are formed at the respective pixel rows while proceeding in the horizontal direction. Data lines 62 cross over the gate lines 22 to transmit data signals while defining the pixels. The data lines 62 are formed at the respective pixel columns while proceeding in the vertical direction.

The blue pixels involve the same arrangement structure as the red and the green pixels. Thin film transistors are formed at the crossing area of the gate lines 22 and the data lines 62. Each thin film transistor has a gate electrode 26 connected to the gate line 22, a source electrode 65 connected to the data line 62, and a drain electrode 66 facing the source electrode 65 around the gate electrode 26 together with a semiconductor layer 40. A pixel electrode 82 is formed at each blue pixel such that it is electrically connected to the gate line 22 and the data line 62 by way of the thin film transistor. Storage capacitor electrode lines 23 are formed at the same plane as the gate lines 22 while proceeding in the horizontal direction. The storage capacitor electrode lines 23 are overlapped with the pixel electrodes 82 to thereby form storage capacitors. The data line assembly additionally includes storage capacitor conductive patterns 64 connected to the drain electrodes 66. The storage capacitor conductive patterns 64 are overlapped with the storage capacitor electrode lines 23 to further enhance the storage capacity. The contact holes 76 formed at the passivation layer 70 (as shown in FIGS. 1 and 2) to connect the pixel electrodes 82 to the data line assembly are placed over the storage capacitor conductive patterns 64, and data pads 68 are connected to the ends of the data lines 62 to receive picture signals from the outside and transmit them to the data lines 62. In this structure, the data lines 62 for transmitting the data signals to the blue pixel columns B receive the data signals through the respective data pads 68 so that the inversion driving can be easily made. That is, as with the structure related to the fourth to the ninth preferred embodiments, the complicated wiring line structure for the inversion driving is no longer required. Furthermore, the data line assembly need not involve a data line connection unit and a data line cross-connection unit to make the inversion driving. In this way, the linear resistance of the wiring lines can be uniformly realized over the entire substrate area. In addition, the data lines 66 at the blue pixels B are connected to the respective data pads 68 to receive the picture signals so that the rendering can be easily made with other effects related to the first to the third preferred embodiments.

When the rendering operation is made, the blue pixels only minutely influence the resolution. Therefore, the pixel voltages are applied only to the red and the green pixels. In relation to the pixel arrangement structures according to the fourth to the ninth preferred embodiments, as the blue pixels are arranged in an irregular manner, the red or the green pixels involve a non-symmetrical structure in four directions. For this reason, the center of the pixel where the picture image is displayed is deviated from the center of the pixel to be established for the rendering operation, and this results in the so-called phase error. As the blue pixels do not nearly influence the resolution, with the rendering operation, the pixel voltages for the red or the green pixels are established, and applied thereto while disregarding the blue pixel regions. However, as the blue pixel area is substantially existent, the center of the pixel for the displaying is deviated from the center of the pixel for the rendering so that the phase error is made. In order to solve such a problem, the blue pixel area is established to be smaller than the red pixel area and the green pixel area. This will be now explained in detail.

Figure 20:
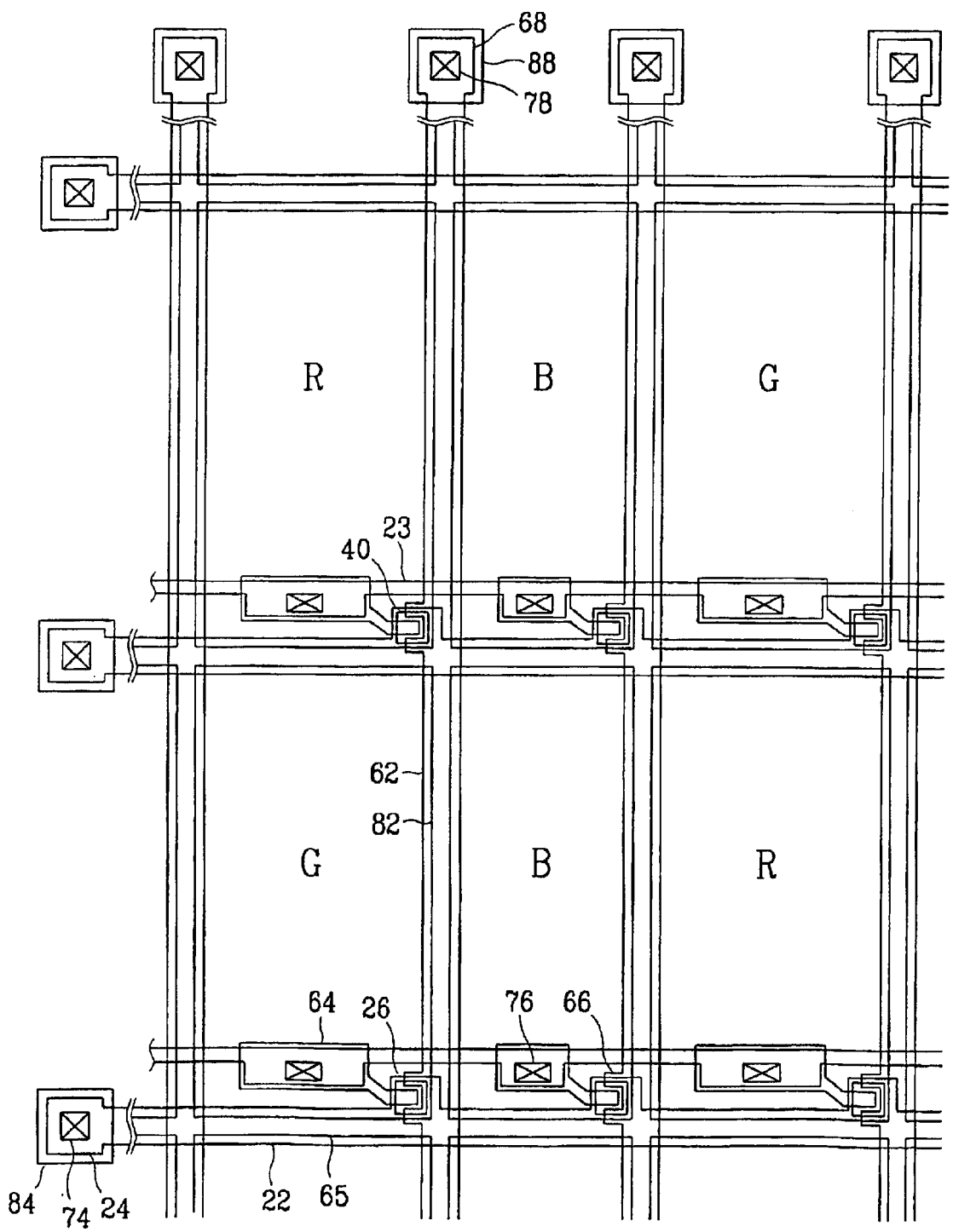
FIG. 20 is a plan view of a liquid crystal display according to an eleventh preferred embodiment of the present invention.

FIG. 20 is a plan view of a thin film transistor array substrate for a liquid crystal display according to an eleventh preferred embodiment of the present invention. As shown in FIG. 20, other components and structures of the thin film transistor array substrate are the same as those related to the tenth preferred embodiment except that the area of the blue pixel B is established to be smaller than the area of the red pixel R and the area of the green pixel G.

Specifically, the width of the blue pixel B is established to be narrower than that of the red pixel R and the green pixel G. In this structure, the blue pixel area is so small that the center of the red pixel R and the green pixel G for the displaying can approximate to the center of the red pixel R and the green pixel G with respect to the data voltage established for the rendering operation. This minimizes the possible phase error. As the blue pixel B is smaller than the red pixel R and the green pixel G, the storage capacity thereof is also established to be smaller than that of the latter. For this purpose, the storage capacitor conductive pattern 68 for the blue pixel B is overlapped with the corresponding storage capacitor line 23 with an area smaller than that of the red pixel R and the green pixel G.

However, in case the blue pixel area is established to be smaller than the green pixel area and the red pixel area, the green pixel area becomes relatively great while elevating the brightness, but the values of X and Y at the color coordinates are increased so that the picture image totally becomes reddish. In order to solve such a problem, when a backlight is made to be used as a source of light for the liquid crystal display, the amount of light of the blue color is increased to be greater than that of the red color and the green color at the optimum white color condition in that the ratios in the amount of light of the red, the green and the blue colors are established to be 1:1:1. This will be now explained in detail.

Figures 21, 22:
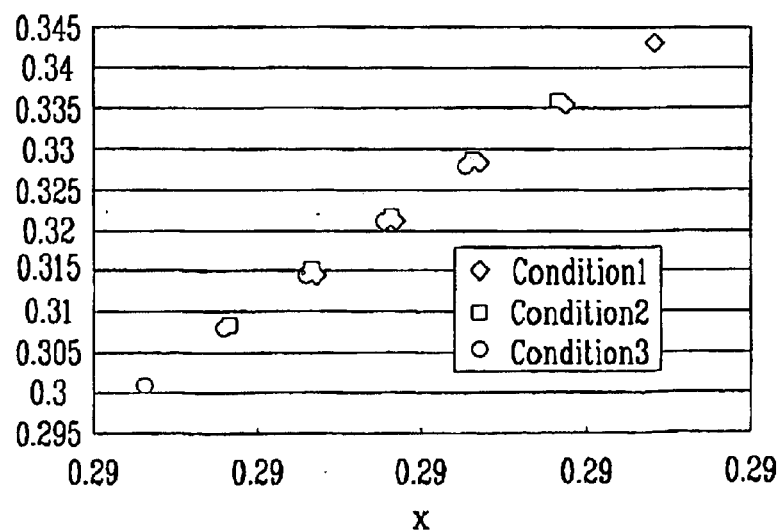
FIG. 21 is a table illustrating the variation in the color coordinates as a function of the variation in the amount of light of the red, the green and the blue colors with the backlight as well as the variation in the area of the red, the green and the blue pixels.
FIG. 22 is a graph illustrating the results shown in FIG. 21.

FIG. 21 illustrates the variation in the color coordinates as a function of the variation in the amount of light of the red, the green and the blue colors with the backlight as well as the variation in the area of the red, the green and the blue pixels, and FIG. 22 is a graph illustrating the results shown in FIG. 21. In the drawings, the condition 1 indicates the optimum condition in that the light of the backlight turns out to be white, and the ratios in the amount of light of the red, the green and the blue colors are established to be 1:1:1. The condition 2 indicates the case in that the ratios in the amount of light of the red, the green and the blue colors are established to be 0.93:0.98:1.09, compared to the condition 1. The condition 3 indicates the case in that the ratios in the amount of light of the red, the green and the blue colors are established to be 0.87:0.95:1.18, compared to the condition 1. The small letters x and y indicate the positions in the color coordinates. The increase in the values of x and y means that the picture image becomes brownish, and the decrease in the values of x and y means that the picture image becomes greenish.

As shown in FIGS. 21 and 22, with the respective conditions 1 to 3, as the blue pixel area becomes reduced while increasing the red pixel area and the green pixel area, the values of x and y are increased. In case the red pixel area, the blue pixel area and the green pixel area are the same, as the amount of light of the blue color in the backlight becomes increased, the values of x and y becomes decreased. Assume that the blue pixel area becomes decreased by 20% compared to the red and the green pixel areas. In this case, when the ratios in the amount of light of the red, the green and the blue colors with the backlight are controlled to be 0.87:0.95:1.18, the color coordinates where the ratios of the red pixel area, the blue pixel area and the green pixel area are 1:1:1, and the ratios in the amount of light of the red, the blue and the green colors with the backlight are 1:1:1 can be obtained. Therefore, when the blue pixel area becomes reduced to minimize the phase error occurred during the rendering operation, the amount of light of the blue color in the backlight is controlled such that the color coordinates involves the desired values. In this way, the color representation effect can be optimized.

As described above, in the inventive Pentile Matrix pixel arrangement structure, the high resolution expression capacity being advantageous in displaying a letter or a device is exerted while minimizing the design cost. As the data lines for transmitting signals to the blue unit pixels are linearly formed with the same shape as other wiring lines so that the display characteristic can be obtained in a uniform manner. Furthermore, the storage capacity can be obtained using the front gate lines while optimizing the parasitic capacitance due to the overlapping of the pixel electrode connectors and their own gate lines, and forming the storage capacity in a uniform manner. In addition, the data line assembly and the gate line assembly are spaced apart from each other with a predetermined distance while preventing the neighboring wiring lines from being short-circuited. The data driving ICs may be arranged at one-sided regions of the display area using the data pad connectors while optimizing the size of the display device. In this case, the repair lines may be easily formed at the periphery of the display area to repair the possible cutting or short-circuiting of the wiring lines. Furthermore, the picture signals are cross-applied to the neighboring red and green pixel columns between the two blue pixel columns electrically connected to each other so that inversion driving can be made with more uniform polarity. In addition, the neighboring blue pixel columns may be arranged to move by the distance of ½ of the pixel. Consequently, uniform inversion driving can be made with the front gate line or the current gate line at all of the blue pixels, and at the same time, the storage capacity can be obtained in a uniform manner. Furthermore, the gate lines and the data lines are overlapped with the pixel electrodes while interposing a low dielectric insulating material so that maximized aperture ratio can be obtained. In this way, the rendering driving technique can be used in an effective manner while expressing the picture images with a high precision and a high resolution. Furthermore, the data lines receive the picture signals through the respective data pads so that complicated wiring line structure or wiring line connection structure is not required while easily making the rendering operation or the inversion driving. In addition, the blue pixel area is established to be smaller than the red pixel area and the green pixel area so that the phase error made at the rendering operation can be minimized. In this case, the amount of light of the blue color in the backlight becomes increased, thereby optimizing the color representation effect.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:

pixels of red, blue and green sequentially arranged in the row direction, the red and the green pixels being alternately arranged in the column direction while the blue pixels being repeatedly arranged in the column direction, the four red and green pixels surrounding the two blue pixels at the two neighboring pixel rows facing each other around the blue pixels, wherein the blue pixels each have a size smaller than a size of the respective red and green pixels;

gate lines arranged at the respective pixel rows to transmit scanning signals or gate signals to the pixels while proceeding in the horizontal direction;

data lines crossing over the gate lines in an insulating manner to transmit picture signals or data signals to the pixels, the data lines being arranged at the respective pixel columns while proceeding in the vertical direction;

pixel electrodes formed at the respective pixels in the pixel row and column directions to receive the data signals; and thin film transistors formed in the pixel row and column directions, the thin film transistors having gate electrodes connected to the gate lines, source electrodes connected to the data lines, and drain electrodes connected to the pixel electrodes.

2. The liquid crystal display of claim 1 being driven using a rendering technique.

3. The liquid crystal display of claim 1 wherein the pixel electrodes are overlapped with the front gate lines for transmitting the scanning or gate signals to the neighboring front pixel rows, or storage capacitor electrode lines formed at the same plane as the gate lines while being separated from the gate lines, thereby forming storage capacitors.

4. The liquid crystal display of claim 1 further comprising storage capacitor electrode lines formed at the same plane as the gate lines, and storage capacitor conductive patterns connected to the drain electrodes and overlapped with the storage capacitor electrode lines.

5. The liquid crystal display of claim 1 further comprising a passivation layer formed between the pixel electrodes and the gate lines or the data lines with an acryl-based organic insulating material or a low dielectric insulating material bearing a dielectric constant of 4.0 or less through chemical vapor deposition, the passivation layer having contact holes for electrically connecting the pixel electrodes to the drain electrodes.

6. The liquid crystal display of claim 5 wherein the contact holes are formed over storage capacitor conductive patterns connected to the drain electrodes.

7. The liquid crystal display of claim 1 further comprising data pads for receiving the data signals from the outside, the data pads being connected with the data lines such that each data pad is connected to only one of the data lines.

8. The liquid crystal display of claim 1 wherein the pixel electrodes are formed with a transparent conductive material, or a reflective conductive material.

9. The liquid crystal display of claim 1 further comprising a backlight where the amount of light of the blue color is established to be larger than the amount of light of the red color and the green color, compared to the white color condition in that the ratios in the amount of light of the red, the green and the blue colors are 1:1:1.

* * * * *